(12) United States Patent
Lee et al.

(10) Patent No.: US 12,134,576 B2
(45) Date of Patent: Nov. 5, 2024

(54) APPARATUS FOR PROCESSING COVER WINDOW AND METHOD FOR PROCESSING COVER WINDOW

(71) Applicant: SAMSUNG DISPLAY CO., LTD., Yongin-si (KR)

(72) Inventors: Sun Ho Lee, Hwaseong-si (KR); Jin Soo Shin, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 59 days.

(21) Appl. No.: 17/661,808

(22) Filed: May 3, 2022

(65) Prior Publication Data

US 2022/0411313 A1 Dec. 29, 2022

(30) Foreign Application Priority Data

Jun. 28, 2021 (KR) ........................ 10-2021-0083560

(51) Int. Cl.
  *C03B 23/03* (2006.01)
  *B29C 43/52* (2006.01)
  *C03B 11/12* (2006.01)
  *B29L 7/00* (2006.01)

(52) U.S. Cl.
  CPC .......... *C03B 23/0307* (2013.01); *B29C 43/52* (2013.01); *C03B 11/122* (2013.01); *B29L 2007/00* (2013.01); *C03B 2215/44* (2013.01); *C03B 2215/50* (2013.01)

(58) Field of Classification Search
  None
  See application file for complete search history.

(56) References Cited

FOREIGN PATENT DOCUMENTS

| KR | 10-2013-0108257 A | 10/2013 | |
| KR | 10-2017-0045967 A | 4/2017 | |
| KR | 10-20170045967 A1 * | 4/2017 | ........... C03B 11/122 |
| KR | 10-2019-0051228 A | 9/2019 | |

OTHER PUBLICATIONS

Machine translation of KR 10-20170045967 A1 (Year: 2017).*

* cited by examiner

*Primary Examiner* — Robert J Grun
(74) *Attorney, Agent, or Firm* — F. CHAU & ASSOCIATES, LLC

(57) ABSTRACT

An apparatus for processing cover windows includes a first mold including a first support a second support spaced apart from the first support, where the first support and second support are configured to hold processing targets; a second mold; and a third mold spaced apart from the second mold. The second mold includes a first pressurizing portion overlapping with the first support, having a first thickness, and a second pressurizing portion connected with the first pressurizing portion and configured to overlap with the first support, having a second thickness thinner than the first thickness. The third mold includes a third pressurizing portion overlapping with the second support, having a third thickness, and a fourth pressurizing portion connected with the third pressurizing portion and overlapping with the second support, having a fourth thickness thinner than the third thickness.

19 Claims, 17 Drawing Sheets

120: 121, 122, 123, 124, 125, 126, 127, 128
130: 131, 132, 133, 134

APPARATUS FOR PROCESSING COVER WINDOW AND METHOD FOR PROCESSING COVER WINDOW

CROSS-REFERENCE TO RELATED APPLICATION

This application claims priority under 35 U.S.C. § 119 to Korean Patent Application No. 10-2021-0083560 filed on Jun. 28, 2021 in the Korean Intellectual Property Office, the disclosure of which is incorporated by reference herein in its entirety.

Technical Field

The present disclosure relates to an apparatus for processing a cover window, and more particularly, to an apparatus for processing a cover window and method for processing a cover window.

Discussion of the Related Art

Recently, display devices for displaying images have seen increased use in consumer electronics. For example, display devices are applied to various electronic appliances such as smart phones, smart watches, digital cameras, notebook computers, navigators, and smart televisions. Various types of display devices such as an organic light emitting display (OLED) and a liquid crystal display (LCD) have been used.

Some display devices may include a cover window to protect a display panel thereon. For example, cover windows may be used to prevent scratches to the display panel, as well as to prevent dust, debris, or moisture from entering the electronic device.

Summary

An object of the present disclosure is to provide an apparatus for processing a cover window and a method for processing a cover window, in which a plurality of cover windows may be processed at one time and the processed cover windows may be prevented from having a defect.

An apparatus for processing one or more cover windows includes a first mold including a first support and a second support spaced apart from the first support; a second mold; and a third mold spaced apart from the second mold, wherein the first support and the second support are each configured to hold a processing target, and wherein the second mold includes a first pressurizing portion overlapping with the first support and having a first thickness, and a second pressurizing portion connected with the first pressurizing portion and overlapping with the first support and having a second thickness thinner than the first thickness, and wherein the third mold includes a third pressurizing portion overlapping with the second support and having a third thickness, and a fourth pressurizing portion connected with the third pressurizing portion and overlapping with the second support and having a fourth thickness thinner than the third thickness.

An apparatus for processing one or more cover windows includes a first mold including a first support and a second support spaced apart from the first support; a second mold; and a third mold spaced apart from the second mold. The first support and second support are each configured to hold a processing target, and the second mold overlaps with the first support and includes a lower surface conformal with an upper surface of the first support, and the third mold overlaps with the second support and includes a lower surface conformal with an upper surface of the second support.

A method for processing one or more cover windows includes preparing a first mold by forming a first support in the first mold and a second support spaced apart from the first support in the first mold; disposing a first processing target on the first and disposing a second processing target on the second support; disposing a second mold including a first pressurizing portion having a first thickness and a second pressurizing portion connected to the first pressurizing portion and having a second thickness thinner than the first thickness on the first processing target, and disposing a third mold including a third pressurizing portion having the first thickness and a fourth pressurizing portion connected to the third pressurizing portion having the second thickness on the second processing target; and pressurizing the second mold and the third mold toward the first mold to process the first processing target and the second processing target into the one or more cover windows.

Details of the other embodiments are included in the detailed description and drawings.

In the apparatus for processing a cover window and the method for processing a cover window according to one embodiment of the present disclosure, a plurality of cover windows may be processed at one time. Also, in the apparatus for processing a cover window and the method for processing a cover window according to one embodiment of the present disclosure, a processing target may uniformly be pressurized per area to reduce a rate processing defects of the cover windows.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE DISCLOSURE

Figure 1:
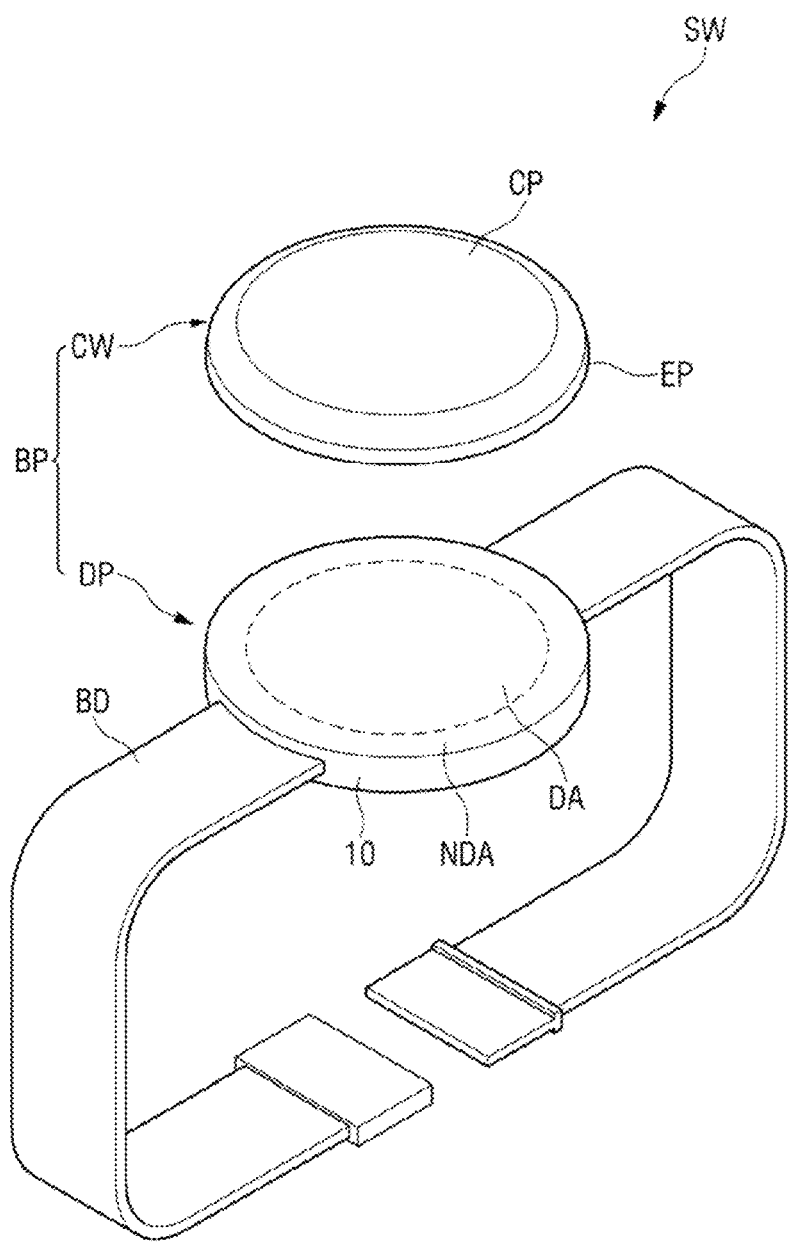
FIG. 1 is an exploded perspective view that illustrates a display device according to one embodiment of the present disclosure.

The inventive concepts disclosed herein may be embodied in many different forms without departing from the spirit and significant characteristics of the inventive concepts.

It will be understood that when an element is referred to as being related to another element, such as being "coupled" or "connected" to another element, or "disposed" on another element, it can be directly coupled or connected to the other element or disposed on the other element, or intervening elements may be present therebetween. By contrast, it should be understood that when an element is related to another element with language such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, like reference symbols in the drawings may denote like elements, and to the extent that a description of an element has been omitted, it may be understood that the element is at least similar to corresponding elements that are described elsewhere in the specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. For example, as used herein, "a", "an," "the," and "at least one" do not denote a limitation of quantity, and are intended to include both the singular and plural, unless the context clearly indicates otherwise. For example, "an element" may have the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not necessarily preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements may then be oriented on "upper" sides of the other elements. The term "lower," can therefore, encompass both an orientation of "lower" and "upper," depending on the particular orientation of the figure. Similarly, if the device in one of the figures is turned over, elements described as "below" or "beneath" other elements may then be oriented "above" the other elements. The terms "below" or "beneath" can, therefore, encompass both an orientation of above and below.

As used herein, when an object is described to have a particular characteristic "on a plane" or "when viewed on a plane," this may refer to a characteristic of the object that is apparent when viewed from a particular angle or in a particular cross-section. For example, a "plane shape" of an object may refer to the shape of the object as viewed from a top-down perspective, or from another perspective as indicated by the accompanying description.

When directionality is used to describe the relationship between two objects, the orientation of an object, or the like, the stated direction will include both directions on the given axis. For example, if an object is described as bending in a first direction X, the object may be bent in the +X or −X direction, as will be readily apparent through the context of the description with reference to the accompanying Figure(s).

"About" or "approximately" as used in the following description is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Example embodiments are described herein with reference to cross-sectional illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, detailed embodiments of the present disclosure will be described with reference to the accompanying drawings.

FIG. 1 is an exploded perspective view that illustrates a display device according to one embodiment of the present disclosure.

Although FIG. 1 illustrates a smart watch as a display device SW according to one embodiment, the present disclosure is not necessarily limited to this example, and other electronic products such as a smartphone and a tablet PC may have the inventive concepts described herein applied to them. For example, the display device SW may be a smartphone or other electronic device according to different embodiments.

Referring to FIG. 1, the display device SW according to one embodiment may include a main body portion BP and a wearing portion BD.

The main body portion BP may include a display portion DP on which an image is displayed, and a cover window CW disposed on the display portion DP.

The display portion DP may be a screen in which various kinds of information, contents, user interfaces and the like are displayed as an image. The display portion DP may be positioned at the center of an upper surface of a main body 10. The display portion DP may include an organic light emitting display, a liquid crystal display and the like, but is not necessarily limited thereto. The display portion DP may include a display area DA on which an image is displayed, and a non-display area NDA positioned near the display area DA. As shown in FIG. 1, a plane shape of the display portion DP may be substantially a circular shape, but is not necessarily limited thereto. The display portion DP may have various shapes. For example, the display portion DP may have a polygonal shape such as a rectangular shape, or an elliptical shape.

The cover window CW may be disposed on an upper portion of the display portion DP. The cover window CW may protect the display portion DP, and may transmit light emitted from the display portion DP. For example, the cover window CW may be substantially transparent to visible light. The cover window CW may include a rigid material such as glass, plastic or quartz.

The cover window CW may overlap the display portion DP and cover an entire surface of the display portion DP. The cover window CW has a shape similar to that of the display portion DP on a plane, for example, when viewed from above, but its size may be greater than the display portion DP. For example, the cover window CW may be protruded more outwardly than the display portion DP. A plane shape of the cover window CW may be the same as that of the body portion BP. For example, the plane shape of the cover window CW may be substantially a circular shape, but is not necessarily limited thereto. The cover window CW may have various shapes, for example, a polygonal shape such as a rectangular shape, or an elliptical shape.

The cover window CW may include a window central portion CP and a window edge portion EP disposed near the window central portion CP.

The window central portion CP is positioned at the center of the cover window CW, and may be substantially flat. The window central portion CP may be an area corresponding to the display area DA of the display portion DP. In one embodiment, the window central portion CP of the cover window CW may cover the entire display area DA of the display portion DP, but is not necessarily limited thereto. For example, the window central portion CP of the cover window CW may cover only a portion of the display area DA of the display portion DP.

The window edge portion EP may be disposed to surround the window central portion CP. The window edge portion EP may be a curved portion that is bent from the window central portion CP. The window edge portion EP may be bent from an edge of the window central portion CP. In some embodiments, a portion of the window edge portion EP includes a curved surface that has a predetermined curvature and includes another portion that may be flat. A degree (or angle) of the window edge portion EP, which is bent from the window central portion CP, may be an obtuse angle, but may be a right angle or an acute angle. In another embodiment, the window edge portion EP may include a curved surface having a predetermined curvature. The curvature of the window edge portion EP may be constant for each area, or may be different for each area.

The wearing portion BD may allow fixing the main body portion BP to a wrist of a user, and may include a strap, a chain and/or a bracelet, for example.

An apparatus 1 for processing a cover window, which will be described later, may include a mold for processing the cover window CW, which includes the window central portion CP and the window edge portion EP partially bent or curved from the window central portion CP. The apparatus 1 for processing a cover window, which will be described later, may process the cover window CW, which includes the window central portion CP and the window edge portion EP, by inserting and pressurizing processing targets (see 'SMP1' and 'SMP2' of FIG. 12).

Hereinafter, the apparatus 1 for pressurizing a cover window according to one embodiment of the present disclosure, which is a mold capable of processing a plurality of cover windows CW at one time, will be described with reference to FIGS. 2 to 11. Although the following description will be based on a structure capable of processing two cover windows CW with one-time process, the apparatus 1 for processing a cover window according to one embodiment may have a structure capable of processing a larger number of cover windows CW through one-time process, without necessarily being limited thereto.

Figure 2:
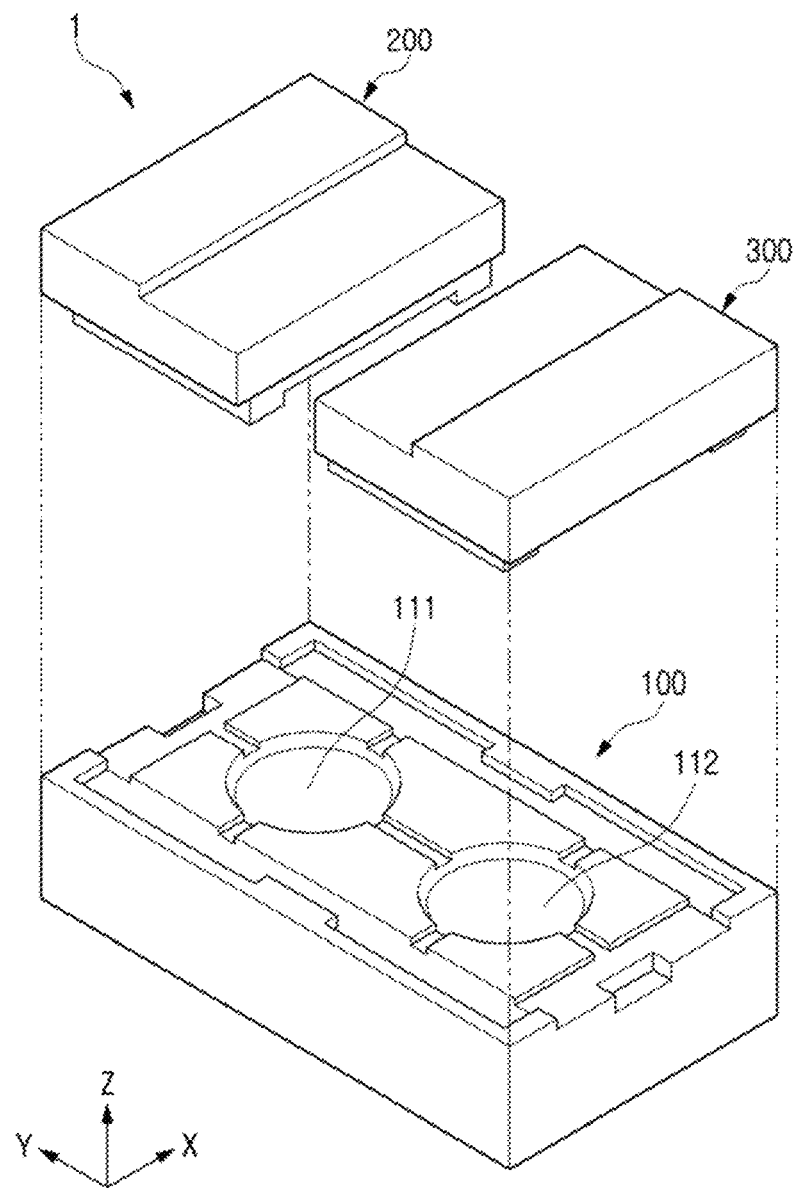
FIG. 2 is a perspective view that illustrates an apparatus for processing a cover window according to one embodiment of the present disclosure.
Figure 3:
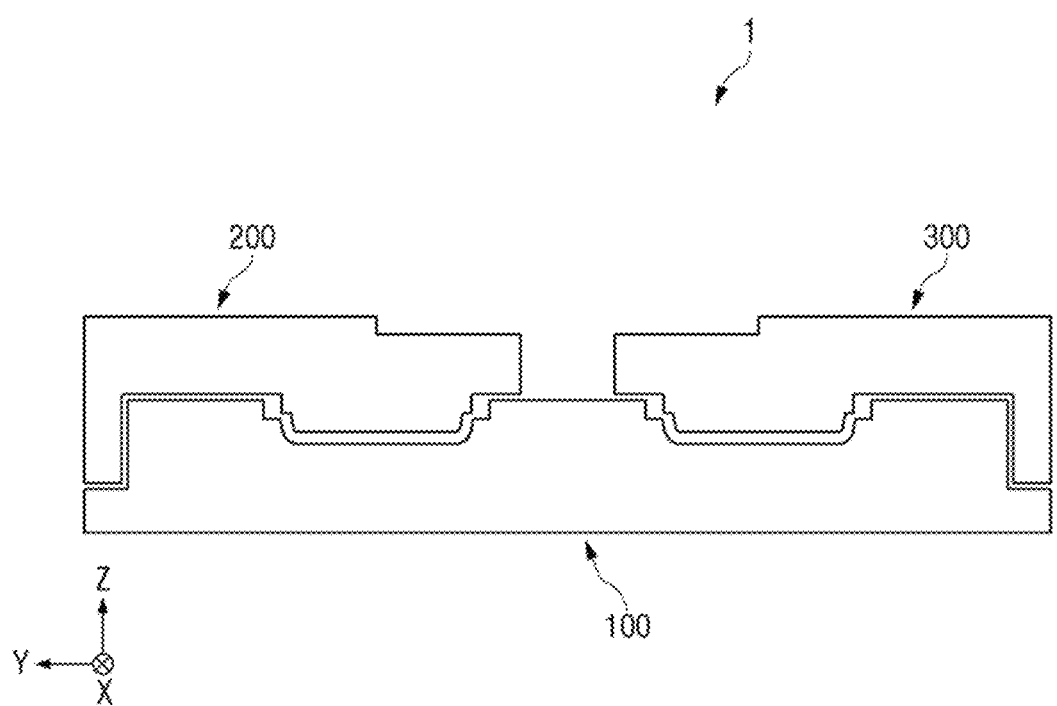
FIG. 3 is a schematic view that illustrates an apparatus for processing a cover window according to one embodiment of the present disclosure.

FIG. 2 is a perspective view that illustrates an apparatus for processing a cover window according to one embodiment. FIG. 3 is a schematic view that illustrates an apparatus for processing a cover window according to one embodiment.

Referring to FIGS. 2 and 3, the apparatus 1 for processing a cover window according to one embodiment may include a first mold 100, a second mold 200 and a third mold 300. The second mold 200 and the third mold 300 may be disposed on the first mold 100. The second mold 200 and the third mold 300 may face each other. The apparatus 1 for processing a cover window according to one embodiment may further include a stage STG1 and a pressurizing member STG2. The description of the stage STG1 and the pressurizing member STG2 will be described later with reference to FIGS. 12 to 14 that illustrate a processing procedure.

In one embodiment, the first mold 100 may include a first support 111 and a second support 112 disposed on the other side of the first support 111 in a second direction Y.

The second mold 200 may be disposed on the first support 111 of the first mold 100. The third mold 300 may be disposed on the second support 112 of the first mold 100. The second mold 200 and the third mold 300 may have substantially the same structure. In detail, the second mold 200 and the third mold 300 are disposed to face each other in the second direction Y, but may be molds that substantially have the same structure. For example, the structures of second mold 200 and the third mold 300 may be mirror images of each other.

After a first processing target (see 'SMP1' in FIG. 12) is disposed on the first support 111 of the first mold 100, the first processing target may be pressurized with the second mold 200 in a third direction Z to process the cover window CW. In addition, after a second processing target (see 'SMP2' in FIG. 12) is disposed on the second support 112 of the first mold 100, the second processing target may be pressurized with the third mold 300 toward the other side in the third direction Z to process the cover window CW. As used herein, the "processing" of a cover window CW may include deforming a processing target with a mold in order to form the processing target into the shape of the cover window CW.

A detailed structure of the first mold 100 will be described later with reference to FIGS. 4 to 6, and a detailed structure of the second mold 200 and the third mold 300 will be described later with reference to FIGS. 7 to 11.

Figure 4:
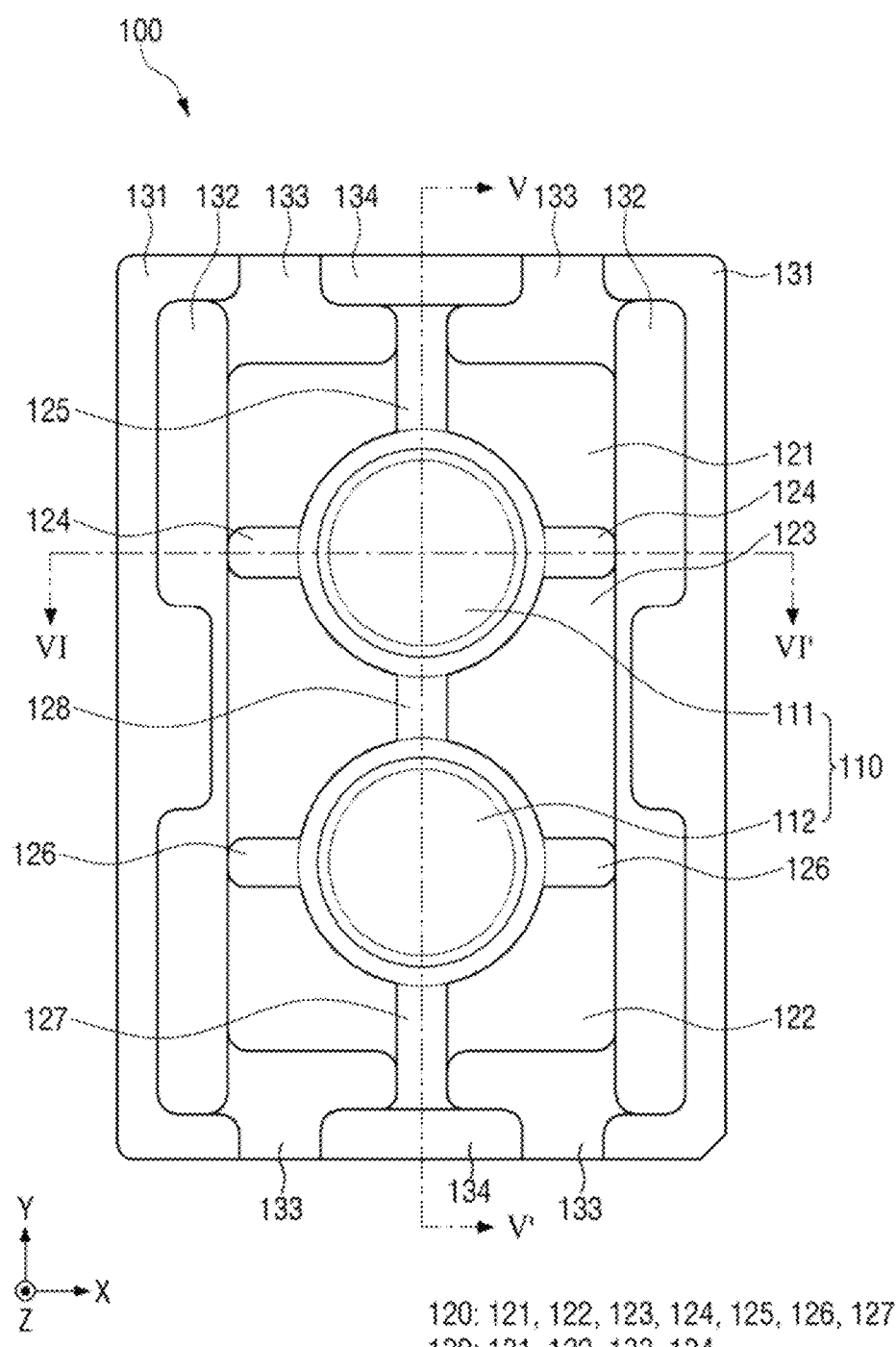
FIG. 4 is a plan view that illustrates a first mold according to one embodiment of the present disclosure.

FIG. 4 is a plan view that illustrates a first mold according to one embodiment of the present disclosure. FIG. 5 is a cross-sectional view taken along line V-V' of FIG. 4. FIG. 6 is a cross-sectional view taken along line VI-VI' of FIG. 4.

Figure 5:
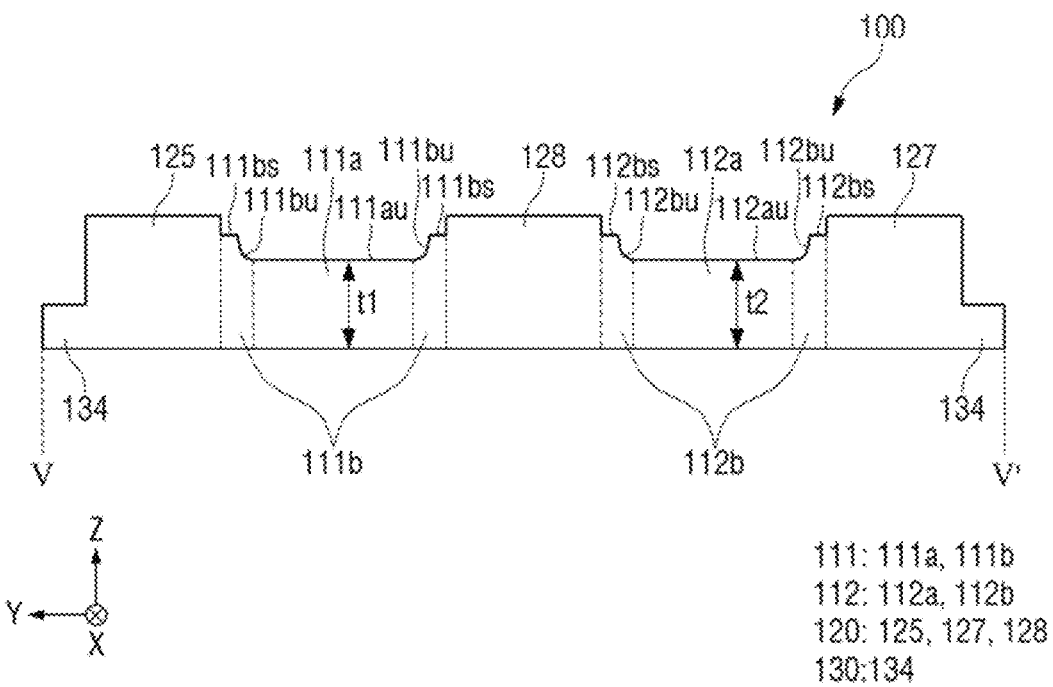
FIG. 5 is a cross-sectional view taken along line V-V' of FIG. 4.
Figure 6:
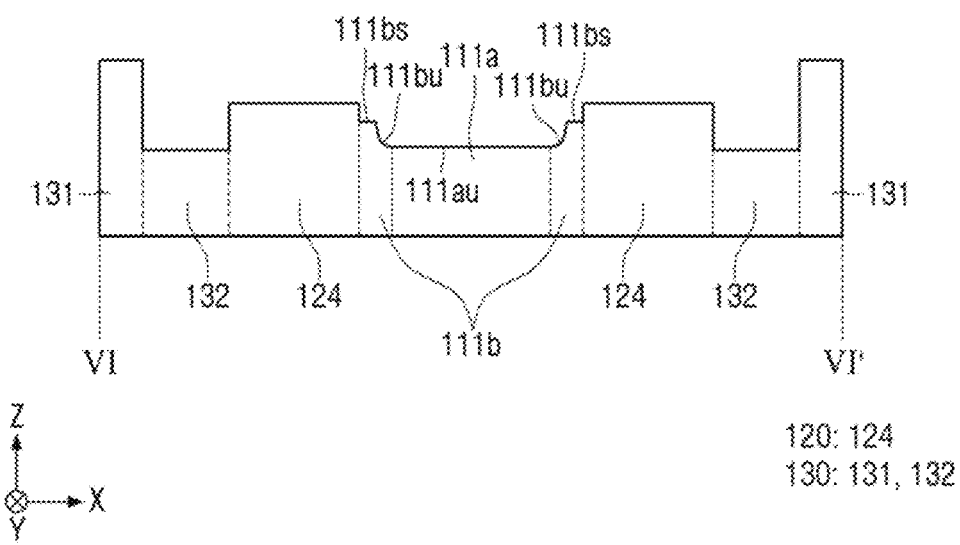
FIG. 6 is across-sectional view taken along line VI-VI' of FIG. 4.

Referring to FIGS. 4 to 6, the first mold 100 may include a plurality of supports 110, a first base portion 120 which sounds the plurality of supports 110, and a second base portion 130 which sounds the first base portion 120. The first mold 100 may be a lower mold in the apparatus 1 for processing a cover window according to one embodiment.

In some embodiments, a plane shape of the first mold 100 may be a rectangular shape. For example, the plane shape of the first mold 100 may be a rectangular shape that includes short sides which extend in a first direction X and long sides which extend in a second direction Y, but is not necessarily limited thereto. The plane shape of the first mold 100 may be other polygonal shape, a circular shape, or an elliptical shape.

The plurality of supports 110 included in the first mold 100 may include a first support 111 and a second support 112 spaced apart from the first support 111 in the second direction Y.

The first support 111 may have a structure in which an upper surface is recessed toward the other side in the third direction Z. For example, the upper surface of the first support 111 may bend in the −Z direction. The first support 111 may include a first support central portion 111a and a first support edge portion 111b disposed to surround the first support central portion 111a.

The first support central portion 111a may be disposed substantially at the center of the first support 111. The first support central portion 111a may include a flat upper surface 111au. A plane shape of the upper surface 111au of the first support central portion 1a may be, for example, a circular shape, but is not necessarily limited thereto. For example plane shape of the upper surface 111au of the first support central portion 111a may be an elliptical shape or other polygonal shape. The upper surface 111au of the first support central portion 111a may be positioned on the other side in the third direction Z rather than an upper surface of the first base portion 120 that will be described later. For example, the upper surface 111au of the first support central portion 111a may be recessed from the third direction Z.

Upper surfaces 111bu and 111bs of the first support edge portion 111b may include a curved portion 111bu connected with the upper surface 111au of the first support central portion 111a and disposed on an inner side, and a flat seating portion 111bs surrounding the curved portion 111bu. Processing targets (see 'SMP1' and 'SMP2' of FIG. 12) that have not been processed may be seated on the seating portion 111bs. The curved portion 111bu of the first support edge portion 111b may have a shape which is recessed toward the other side in the third direction Z from the seating portion 111bs to the first support central portion 111a.

A plane shape of the first support 111 may be a circular shape, but is not necessarily limited thereto. Various modifications may be made in the plane shape of the first support 111 depending on the design of the cover window CW to be processed. For example, the first support 111 for processing a cover window CW that has a polygonal plane shape may have a polygonal plane shape, and the first support 111 for processing a cover window CW that has an elliptical plane shape may have an elliptical plane shape.

The second support 112 may have a structure in which an upper surface thereof is recessed in the negative third direction −Z. The second support 112 may include a second support central portion 112a and a second support edge portion 112b disposed to surround the second support central portion 112a. The structure of the second support 112 may substantially be the same as that of the first support 111.

The second support central portion 112a may be disposed substantially at the center of the second support 112. The second support central portion 112a may include a flat upper surface 112au. A plane shape of the second support central portion 112a may substantially be the same as that of the second support 112. For example, the plane shape of the second support central portion 112a may be a circular shape, but is not necessarily limited thereto. The plane shape of the second support central portion 112a may be an elliptical shape or other polygonal shape. The upper surface 112au of the second support central portion 112a may be positioned on the other side in the third direction Z rather than an upper surface of the second base portion 130, which will be described later. For example, the upper surface 112au of the second support central portion 112a may be recessed from the third direction Z into the negative third direction −Z. The position of the second support central portion 112a in the third direction Z may substantially be the same as that of the first support central portion 111a in the third direction Z. In other words, a height of the second support central portion 112a may substantially be the same as that of the first support central portion 111a.

Upper surfaces 112bu and 112bs of the second support edge portion 112b may include a curved portion 112bu connected with the upper surface 112au of the first support central portion 112a and disposed on an inner side, and a flat seating portion 112bs surrounding the curved portion 112bu. The curved portion 112bu of the second support edge portion 112b may have a shape recessed in the negative third direction −Z from the seating portion 112bs to the second support central portion 112a.

A plane shape of the second support 112 may be a circular shape but is not necessarily limited thereto. Various modifications may be made in the plane shape of the support depending on the design of the cover window CW. For example, the second support 112 for processing a cover window CW having a polygonal plane shape may have an polygonal plane shape, or the second support 112 for processing a cover window CW having an elliptical plane shape may have an elliptical plane shape. The plane shape of the second support 112 may substantially be the same as that of the first support 111. In this case, the same plane shape in the second support 12 and the first support 111 means that the same area is also applied thereto. However, in some embodiments the plane shape of the second support 112 may be different from that of the first support 111.

A thickness t1 of the first support 111 may mean a distance between the upper surface 111au and a lower surface of the first support central portion 111a, and a thickness t2 of the second support 112 may mean a distance between the upper surface 112au and a lower surface of the second support central portion 112a. The thickness t1 of the first support 111 and the thickness t2 of the second support 112 may substantially be the same as each other.

The support 110 may be surrounded by a first base portion 120. The first base portion 120 may include a first sub-base portion 121, a second sub-base portion 122, a third sub-base portion 123, a first exhaust portion 124, a second exhaust portion 125, a third exhaust portion 126, a fourth exhaust portion 127 and a fifth exhaust portion 128.

The first sub-base portion 121 may be positioned on one side in the second direction Y of the first support 111. The first sub-base portion 121 may surround a half area of one side in the second direction Y of the first support 111. The first sub-base portion 121 may be connected with the first support edge portion 111b. The first sub-base portion 121 may be disposed with the second exhaust portion 125 interposed therebetween, which will be described later.

The second sub-base portion 122 may be positioned on the other side in the second direction Y of the second support 112. For example, when viewed in a plane view orientation as illustrated in FIG. 4, the first sub-base portion 121 may be disposed in a top region, the third sub-base portion 123 may be disposed in a middle region, and the second sub-base portion 122 may be disposed in a bottom region. The second sub-base portion 122 may surround a half area of the other side in the second direction Y of the second support 112. The second sub-base portion 122 may be connected with the second support edge portion 112b. The second sub-base portion 122 may be disposed with the fourth exhaust portion 127 interposed therebetween, whic0h will be described later.

The third sub-base portion 123 may be disposed between the first sub-base portion 121 and the second sub-base portion 122. The third sub-base portion 123 may be disposed between the first support 111 and the second support 112. The third sub-base portion 123 may surround a half area of the other side in the second direction Y of the first support 111, and may surround a half area of one side in the second direction Y of the second support 112. The third sub-base portion 123 may be disposed with the fifth base portion 128 interposed therebetween, which will be described later. The first exhaust portion 124, which will be described later, may be disposed between the third sub-base portion 123 and the first sub-base portion 121, and the third exhaust portion 126, which will be described later, may be disposed between the third sub-base portion 123 and the second sub-base portion 122.

The first exhaust portion 124 may extend longwise in the first direction X, and may be disposed on one side and the other side of the first support 111 in the first direction X. As described above, the first exhaust portion 124 may be disposed between the first sub-base portion 121 and the third sub-base portion 123. That is, the first sub-base portion 121 may be positioned on one side in the second direction Y of the first exhaust portion 124, and the third sub-base portion 123 may be positioned on the other side in the second direction Y thereof. The first exhaust portion 124 may have a shape recessed in the negative third direction −Z rather than an upper surface of the first sub-base portion 121 and an upper surface of the third sub-base portion 123.

The second exhaust portion 125 may extend longwise in the second direction Y, and may be disposed on one side of the first support 111 in the second direction Y. As described above, the second exhaust portion 125 may be disposed between the first sub-base portions 121. That is, the first sub-base portion 121 may be positioned on one side and the other side in the first direction X of the second exhaust portion 125. The second exhaust portion 125 may have a shape recessed in the negative third direction −Z rather than recessed toward the upper surface of the first sub-base portion 121.

The third exhaust portion 126 may extend longwise in the first direction X, and may be disposed on one side and the other side of the second support 112 in the first direction X. As described above, the third exhaust portion 126 may be disposed between the second sub-base portion 122 and the third sub-base portion 123. That is, the third sub-base portion 123 may be positioned on one side in the second direction Y of the third exhaust portion 126, and the second sub-base portion 122 may be positioned on the other side in the second direction Y thereof. The third exhaust portion 126 may have a shape recessed in the negative third direction −Z rather than an upper surface of the second sub-base portion 122 and the upper surface of the third sub-base portion 123.

The fourth exhaust portion 127 may extend longwise in the second direction Y, and may be disposed on the other side of the second support 112 in the second direction Y. As described above, the fourth exhaust portion 127 may be positioned between the second sub-base portions 122. That is, the second sub-base portion 122 may be positioned on one side and the other side in the first direction X of the fourth exhaust portion 127. The fourth exhaust portion 127 may have a shape recessed in the negative third direction −Z rather than recessed toward the upper surface of the second sub-base portion 122.

The fifth exhaust portion 128 may extend longwise in the second direction Y, and may be disposed between the first support 111 and the second support 112. In addition, the fifth base portion 128 may be disposed between the third sub-base portions 123. That is, the first support 111 may be positioned on one side of a second direction Y of the fifth exhaust portion 128, the second support 112 may be positioned on the other side in the second direction Y thereof, and the third sub-base portion 123 may be positioned on one side and the other side in the first direction X thereof. The fifth exhaust portion 128 may have a shape recessed in the negative third direction −Z rather than recessed toward the upper surface of the third sub-base portion 123.

The upper surface of the first sub-base portion 121, the upper surface of the second sub-base portion 122 and the upper surface of the third sub-base portion 123 may be disposed at the same position along the third direction Z. An upper surface of the first exhaust portion 124, an upper surface of the second exhaust portion 125, an upper surface of the third exhaust portion 126, an upper surface of the fourth exhaust portion 127 and an upper surface of the fifth exhaust portion 128 may be disposed at the same position along the third direction Z.

In addition, the upper surface of the first sub-base portion 121, the upper surface of the second sub-base portion 122 and the upper surface of the third sub-base portion 123 may be positioned on one side in the third direction Z rather than on the upper surface of the first exhaust portion 124, the upper surface of the second exhaust portion 125, the upper surface of the third exhaust portion 126, the upper surface of the fourth exhaust portion 127 and the upper surface of the fifth exhaust portion 128. That is, the upper surface of the first sub-base portion 121, the upper surface of the second sub-base portion 122 and the upper surface of the third sub-base portion 123 may be positioned to be higher than the upper surface of the first exhaust portion 124, the upper surface of the second exhaust portion 125, the upper surface of the third exhaust portion 126, the upper surface of the fourth exhaust portion 127 and the upper surface of the fifth exhaust portion 128.

The upper surface of the first exhaust portion 124, the upper surface of the second exhaust portion 125, the upper surface of the third exhaust portion 126, the upper surface of the fourth exhaust portion 127 and the upper surface of the fifth exhaust portion 128 may be positioned on one side in the third direction Z rather than on an upper surface of the first support central portion 111a of the first support 111 and an upper surface of the second support central portion 112a of the second support 112. That is, the upper surface of the first exhaust portion 124, the upper surface of the second exhaust portion 125, the upper surface of the third exhaust portion 126, the upper surface of the fourth exhaust portion 127 and the upper surface of the fifth exhaust portion 128 may be positioned to be higher than the upper surface of the first support central portion 111a of the first support 111 and the upper surface of the second support central portion 112a of the second support 112.

The second base portion 130 may surround the first base portion 120. The second base portion 130 may include a fourth sub-base portion 131, a fifth sub-base portion 132, a sixth sub-base portion 133 and a seventh sub-base portion 134.

The fourth sub-base portion 131 may be disposed on one end and the other end of the first mold 100 in the first direction X. The fourth sub-base portion 131 may extend longwise in the second direction Y. The fourth sub-base portion 131 may include a structure that is disposed at the center of the first mold 100 in the second direction Y and that protrudes from an inner side of the first mold 100.

The fifth sub-base portion 132 may be disposed between the fourth sub-base portion 131 and the first base portion 120. The fifth sub-base portion 132 may extend longwise in the second direction Y. The fifth sub-base portion 132 may include a structure that is disposed at the center in the second direction Y and is recessed from the inner side of the first mold 100. The upper surface of the fifth sub-base portion 132 may be positioned on the other side in the third direction Z rather than on the upper surface of the fourth sub-base portion 131 and the upper surface of the first base portion 120. That is, the upper surface of the fifth sub-base portion 132 may be positioned lower than the upper surface of the fourth sub-base portion 131 and the upper surface of the first base portion 120. These relative heights and positions are shown in the embodiment depicted by FIG. 6.

The sixth sub-base portion 133 may be disposed on one side and the other side in the second direction Y of the first base portion 120. The sixth sub-base portion 133 may be disposed between the fourth sub-base portion 131 that is disposed on one side in the first direction X of the first mold 100 and the fourth sub-base portion 131 that is disposed on the other side in the first direction X of the first mold 100. In addition, the sixth sub-base portion 133 may be disposed between the fifth sub-base portion 132 that is disposed on one side in the first direction X of the first mold 100 and the fifth sub-base portion 132 that is disposed on the other side in the first direction X of the first mold 100. The sixth sub-base portion 133 disposed on one side in the second direction Y of the first base portion 120 may be disposed on one side and the other side in the first direction X with the second exhaust portion 125 interposed therebetween. The sixth sub-base portion 133 disposed on the other side in the second direction Y of the first base portion 120 may be disposed on one side and the other side in the first direction X with the fourth exhaust portion 127 interposed therebetween.

An upper surface of the sixth sub-base portion 133 may be positioned on the other side in the third direction Z rather than on the upper surfaces of the first sub-base portion 121 and the second sub-base portion 122. The upper surface of the sixth sub-base portion 133 may be positioned on one side in the third direction Z rather than on the upper surfaces of the second exhaust portion 125 and the fourth exhaust portion 127. The upper surface of the sixth sub-base portion 133 may be disposed on the other side in the third direction Z rather than on the upper surface of the fourth sub-base portion 131, and may be positioned on one side in the third direction Z rather than on the upper surface of the fifth sub-base portion 132. That is, the upper surface of the sixth sub-base portion 133 may be positioned to be lower than the upper surfaces of the first sub-base portion 121 and the second sub-base portion 122, may be positioned to be higher than the upper surfaces of the second exhaust portion 125 and the fourth exhaust portion 127, may be positioned to be lower than the upper surface of the fourth sub-base portion 131, and may be positioned to be higher than the upper surface of the fifth sub-base portion 132.

The seventh sub-base portion 134 may be disposed on the one side in the second direction Y of the second exhaust portion 125 and the other side in the second direction Y of the fourth exhaust portion 127. The seventh sub-base portion 134 may be disposed between the sixth sub-base portions 133. An upper surface of the seventh sub-base portion 134 may be positioned on the other side in the third direction Z rather than on the upper surface of the sixth sub-base portion 133, and may be positioned on the other side in the third direction Z rather than on the upper surfaces of the second exhaust portion 125 and the fourth exhaust portion 127. That is, the upper surface of the seventh sub-base portion 134 may be positioned to be lower than the upper surface of the sixth sub-base portion 133, and may be positioned to be lower than the upper surfaces of the second exhaust portion 125 and the fourth exhaust portion 127.

Figure 7:
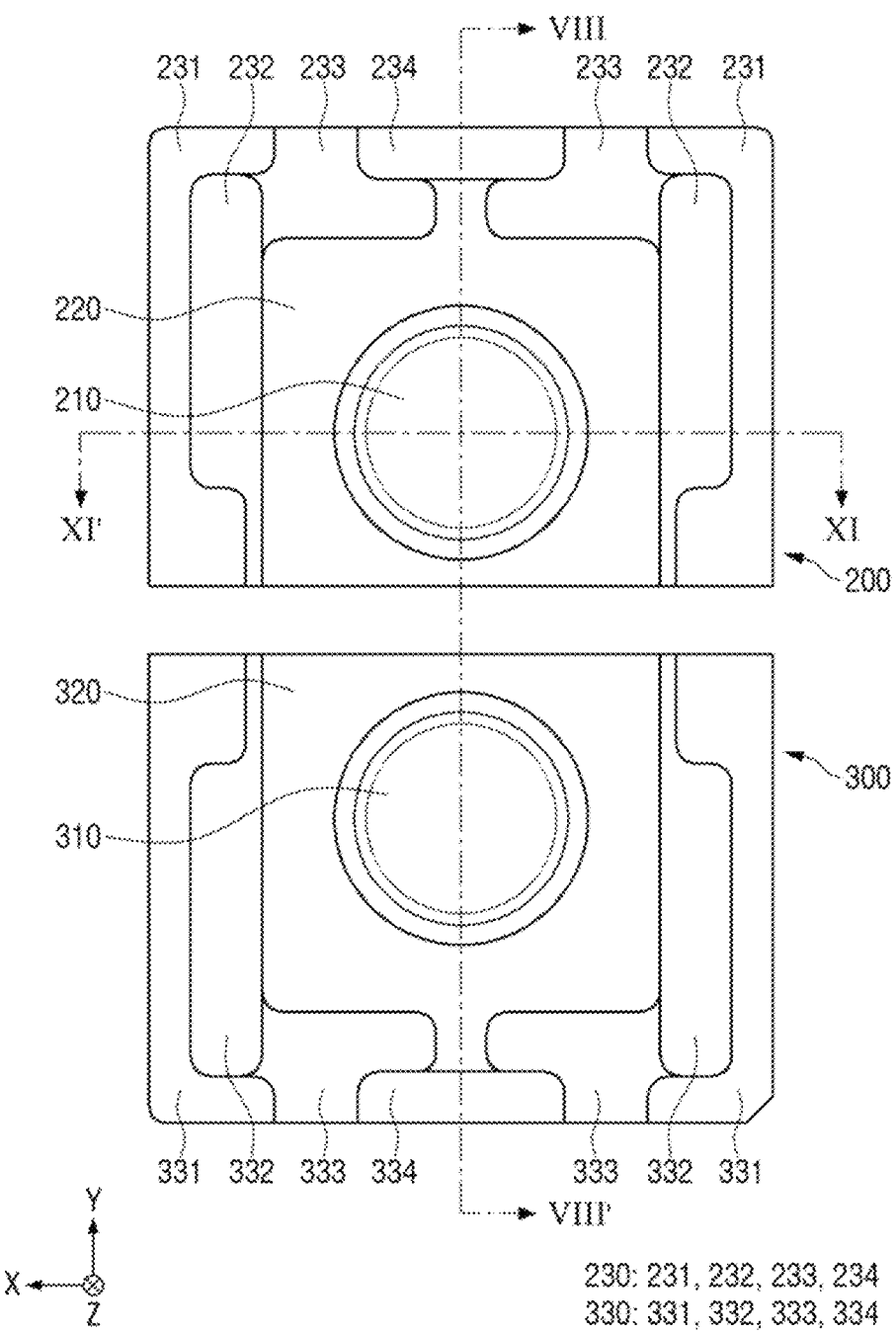
FIG. 7 is a plan view that illustrates a second mold and a third mold according to one embodiment of the present disclosure.
Figure 8:
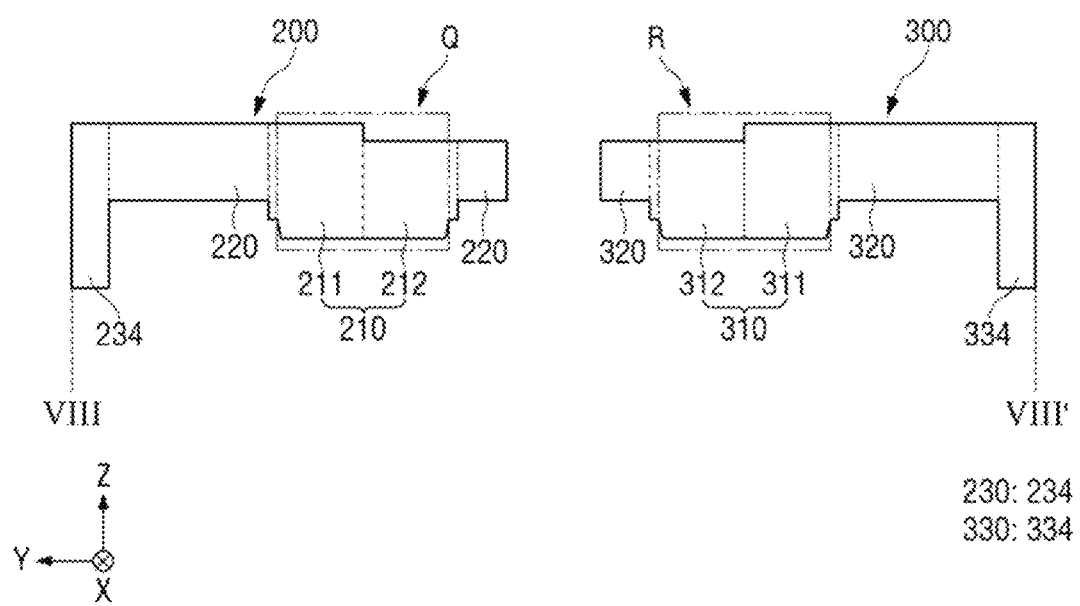
FIG. 8 is a cross-sectional view taken along line VIII-VIII' of FIG. 7.
Figure 9:
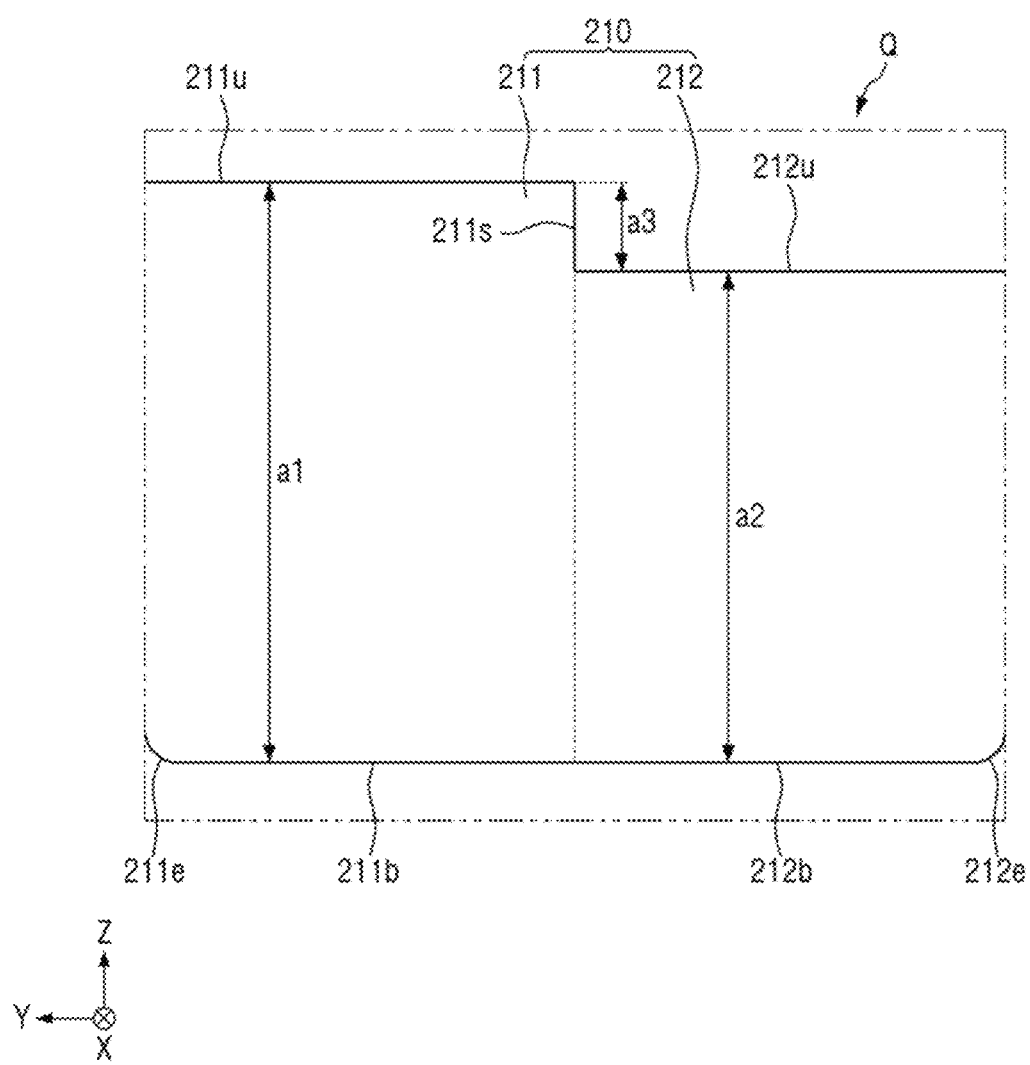
FIG. 9 is an enlarged view that illustrates an area Q of FIG. 8.
Figure 10:
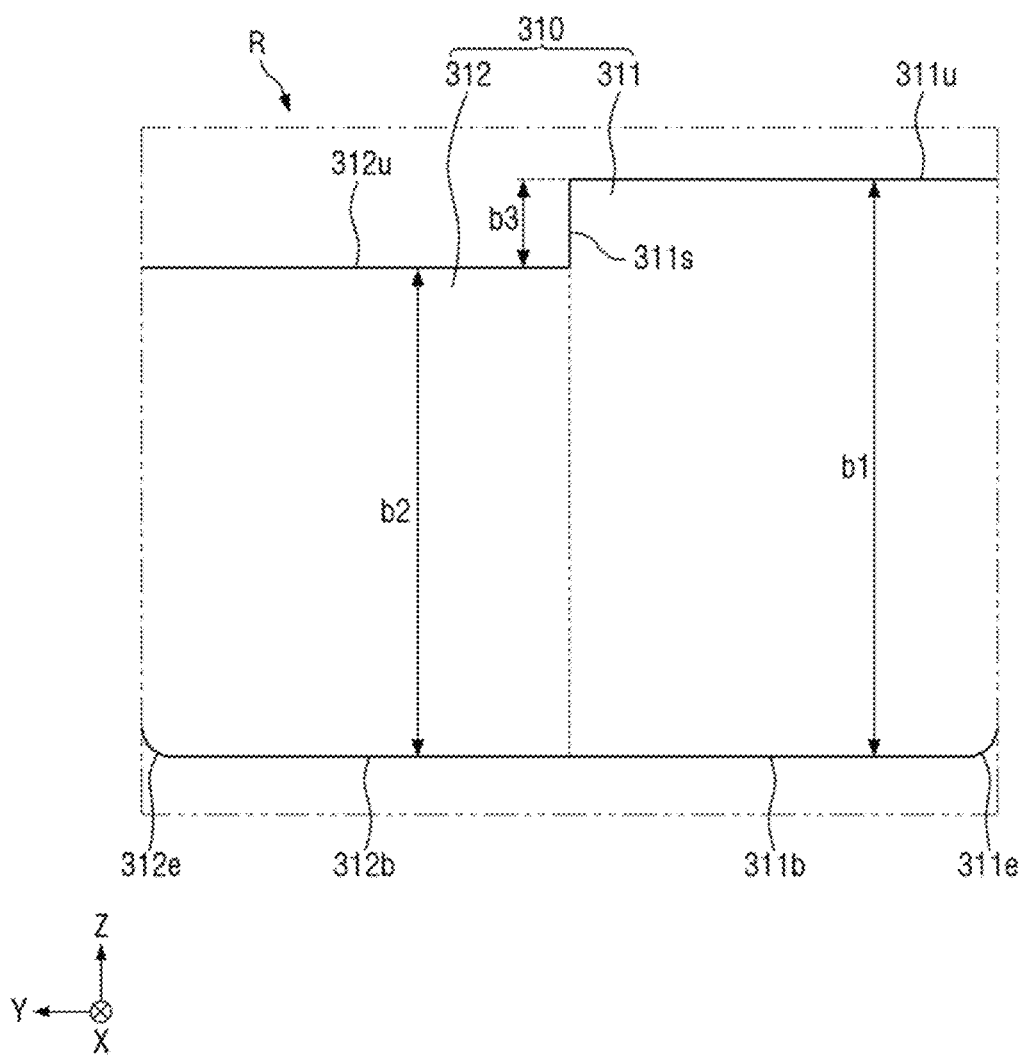
FIG. 10 is an enlarged view that illustrates an area R of FIG. 8.
Figure 11:
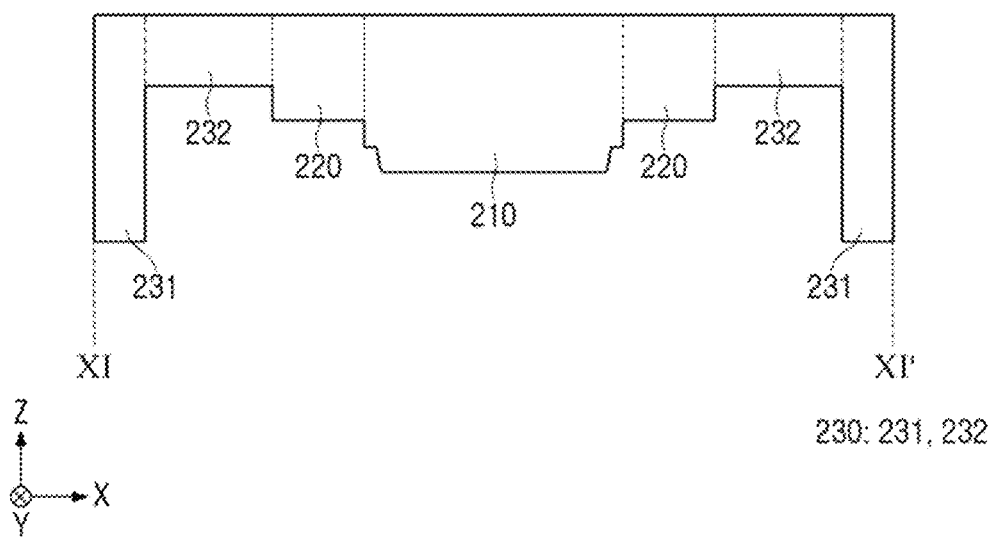
FIG. 11 is a cross-sectional view taken along line XI-XI' of FIG. 7.

FIG. 7 is a plan view that illustrates a second mold and a third mold according to one embodiment of the present disclosure. FIG. 8 is a cross-sectional view taken along line VIII-VIII' of FIG. 7. FIG. 9 is an enlarged view that illustrates an area Q of FIG. 8. FIG. 10 is an enlarged view that illustrates an area R of FIG. 8. FIG. 11 is a cross-sectional view taken along line XI-XI' of FIG. 7.

Structures of the second mold 200 and the third mold 300 will be described with reference to FIGS. 7 to 11. First, the structure of the second mold 200 will be described and then the structure of the third mold 300 will be described.

The second mold 200 may include a first pressurizing portion 210, a first pressurizing base portion 220 surrounding the first pressurizing portion 210 and a second pressurizing base portion 230 surrounding the first pressurizing base portion 220.

The first pressurizing portion 210 may have a structure in which a lower surface is protruded toward the other side in the third direction Z. For example, the lower surface of the first pressurizing portion 210 may protrude in the −Z direction. The first pressurizing portion 210 may correspond to the first support 111 of the first mold 100. When the second mold 200 is coupled with the first mold 100, the first pressurizing portion 210 may be disposed on the first support 111. Lower surfaces 211e, 211b, 212b and 212e that are protruded surfaces of the first pressurizing portion 210 may conform with the upper surfaces 111au and 111bu of the first support 111.

A lower surface of the first pressurizing portion 210 is substantially flat at the center, and an edge of the first pressurizing portion 210 may be a curved surface curved toward the other side in the third direction Z from the outside to the inside.

A plane shape of the first pressurizing portion 210 may be a circular shape but is not necessarily limited thereto. Various modifications may be made in the plane shape of the first pressurizing portion 210 depending on the design of the cover window CW to be processed. For example, the first pressurizing portion 210 for processing a cover window CW having a polygonal plane shape may have a polygonal plane shape, or the first pressurizing portion 210 for processing a cover window CW having an elliptical plane shape may have an elliptical plane shape.

Referring to FIG. 9, the first pressurizing portion 210 may include a first sub-pressurizing portion 211 having a first thickness a1 and a second sub-pressurizing portion 212 having a second thickness a2 which is thinner than the first thickness a1. The first thickness a1 of the first sub-pressurizing portion 211 may be defined as a distance between a flat upper surface 211u and the flat lower surface 211b in the first sub-pressurizing portion 211. The second thickness a2 of the second sub-pressurizing portion 212 may be defined as a distance between a flat upper surface 212u and the flat lower surface 212b in the second sub-pressurizing portion 212.

The first sub-pressurizing portion 211 may be positioned on one side in the second direction Y of the second sub-pressurizing portion 212, and the second sub-pressurizing portion 212 may be positioned on the other side in the second direction Y of the first sub-pressurizing portion 211.

The flat lower surface 211b of the first sub-pressurizing portion 211 and the flat lower surface 212b of the second sub-pressurizing portion 212 may be positioned on the same plane. That is, a step difference might not be formed between the flat lower surface 211b of the first sub-pressurizing portion 211 and the flat lower surface 212b of the second sub-pressurizing portion 212. This is illustrated in the embodiment depicted in FIG. 9.

The upper surface 211u of the first sub-pressurizing portion 211 may be positioned on one side in the third direction Z rather than on the upper surface 212u of the second sub-pressurizing portion 212. A side surface 211s of the first sub-pressurizing portion 211 may be disposed between the upper surface 211u of the first sub-pressurizing portion 211 and the upper surface 212u of the second sub-pressurizing portion 212. The side surface 211s of the first sub-pressurizing portion 211 may be a boundary between the first sub-pressurizing portion 211 and the second sub-pressurizing portion 212. That is, a step difference of a third thickness a3 may be formed in an area where the first sub-pressurizing portion 211 and the second sub-pressurizing portion 212 meet on the upper surfaces 211u and 212u of the first pressurizing portion 210. The third thickness a3 may be the same as a difference between the first thickness a1 and the second thickness a2. The third thickness a3 may range from about 1 mm to about 5 mm.

The first pressurizing portion 210 may include a first sub-pressurizing portion 211 and a second sub-pressurizing portion 212, which have their respective thicknesses a1 and a2 different from each other, thereby forming a step difference on the upper surfaces 211u and 212u. Therefore, in a pressurizing process using the pressurizing member (see 'STG2' of FIG. 13), which pressurizes the first pressurizing portion 210 in contact with the upper surfaces 211u and 212u of the first pressurizing portion 210, a uniform pressurizing force may be transferred to the lower surface of the first pressurizing portion 210 for each area.

The first pressurizing base portion 220 may be disposed to surround the first pressurizing portion 210. A plane shape of an external appearance of the first pressurizing base portion 220 may be a rectangular shape, but is not necessarily limited thereto. The lower surface of the first pressurizing base portion 220 may be positioned on one side in the third direction Z rather than on the lower surface of the first pressurizing portion 210. That is, the lower surface of the first pressurizing portion 210 may have a structure protruded toward the other side in the third direction Z (e.g., in the −Z direction) rather than toward the lower surface of the first pressurizing base portion 220.

The second pressurizing base portion 230 may be disposed outside the first pressurizing base portion 220. The second pressurizing base portion 230 may be disposed to surround the first pressurizing base portion 220.

The second pressurizing base portion 230 may include a first sub-pressurizing base portion 231 disposed on one end and the other end in the first direction X of the second mold 200, a second sub-pressurizing base portion 232 disposed on an inner side rather than on the first sub-pressurizing base portion 231, a third sub-pressurizing base portion 233 disposed on one side in the second direction Y of the first pressurizing base portion 220, and a fourth sub-pressurizing base portion 234 disposed on one side in the second direction Y of the third sub-pressurizing base portion 233.

The first sub-pressurizing base portion 231 may be positioned on one end and the other end in the first direction X of the second mold 200. The first sub-pressurizing base portion 231 may have a shape which extends longwise in the second direction Y. The first sub-pressurizing base portion 231 may have a shape in which the other end in the second direction Y is protruded toward an inner side of the second mold 200.

The second sub-pressurizing base portion 232 may have a shape which extends longwise in the second direction Y. The second sub-pressurizing base 232 may have a shape in which the other end in the second direction Y is recessed toward the inner side of the second mold 200.

A lower surface of the second sub-pressurizing base portion 232 may be positioned on the other side in the third direction Z rather than on the lower surface of the first pressurizing base portion 220. The lower surface of the second sub-pressurizing base portion 232 may be positioned on the other side in the third direction Z rather than on the lower surface of the first sub-pressurizing base portion 231.

The third sub-pressurizing base portion 233 may have a shape which extends longwise in the first direction X. The third sub-pressurizing base portion 233 may be positioned on one side in the second direction Y of the first pressurizing base portion 220. The third sub-pressurizing base portion 233 may be disposed between the first sub-pressurizing base portion 231 disposed on one side in the first direction X and the first sub-pressurizing base portion 231 disposed on the other side in the first direction X. The third sub-pressurizing base portion 233 may be disposed between the second sub-pressurizing base portion 232 disposed on one side in the first direction X and the second sub-pressurizing base portion 232 disposed on the other side in the first direction X.

A lower surface of the third sub-pressurizing base portion 233 may be positioned on one side in the third direction Z rather than on the lower surface of the first pressurizing base portion 220. The lower surface of the third sub-pressurizing base portion 233 may be positioned on one side in the third direction Z rather than on the lower surface of the second sub-pressurizing base portion 232. The lower surface of the third sub-pressurizing base portion 233 may be positioned on one side in the third direction Z rather than a lower surface of the fourth sub-pressurizing base portion 234, which will be described later.

The fourth sub-pressurizing base portion 234 may be disposed on one end in the second direction Y of the second mold 200, and may be surrounded by the third sub-pressurizing base portion 233 on a plane. The lower surface of the fourth sub-pressurizing base portion 234 may be positioned on the other side in the third direction Z rather than on the lower surface of the third sub-pressurizing base portion 233.

Hereinafter, the third mold 300 will be described. The third mold 300 may have a structure substantially the same as that of the second mold 200 described above.

The third mold 300 may include a second pressurizing portion 310, a third pressurizing base portion 320 surrounding the second pressurizing portion 310, and a fourth pressurizing base portion 330 surrounding the third pressurizing base portion 320.

The second pressurizing portion 310 may have a structure in which the lower surface is protruded toward the other side in the third direction Z. For example, the lower surface of the second pressurizing portion 310 may protrude in the −Z direction. The second pressurizing portion 310 may correspond to the second support 112 of the first mold 100. When the third mold 300 is coupled with the first mold 100, the second pressurizing portion 310 may be disposed on the second support 112. Lower surfaces 311e, 311b, 312b and 312e of the second pressurizing portion 310 may conform with the upper surfaces 112au and 112bu of the second support 112.

A plane shape of the second pressurizing portion 310 may be a circular shape, but is not necessarily limited thereto. Various modifications may be made in the plane shape of the second pressurizing portion 310 depending on the design of the cover window CW to be processed. For example, the second pressurizing portion 310 for processing a cover window CW having a polygonal plane shape may have a polygonal plane shape, or the second pressurizing portion 310 for processing a cover window CW having an elliptical plane shape may have an elliptical plane shape.

Referring to FIG. 10, the second pressurizing portion 310 may include a third sub-pressurizing portion 311 having a fourth thickness b1 and a fourth sub-pressurizing portion 312 having a fifth thickness b2 which is thinner than the third thickness a3. The fourth thickness b1 of the third sub-pressurizing portion 311 may be defined as a distance between a flat upper surface 311u and the flat lower surface 311b in the third sub-pressurizing portion 311. The fifth thickness b2 of the fourth sub-pressurizing portion 312 may be defined as a distance between a flat upper surface 312u and the flat lower surface 312b in the fourth sub-pressurizing portion 312. The fourth thickness b1 may substantially be the same as the first thickness a1, and the fifth thickness b2 may substantially be the same as the second thickness a2.

The third sub-pressurizing portion 311 may be positioned on one side in the second direction Y of the fourth sub-pressurizing portion 312, and the fourth sub-pressurizing portion 312 may be positioned on one side in the second direction Y of the third sub-pressurizing portion 311.

The flat lower surface 311b of the third sub-pressurizing portion 311 and the flat lower surface 312b of the fourth sub-pressurizing portion 312 may be positioned on the same plane. That is, a step difference might not be formed between the flat lower surface 311b of the third sub-pressurizing portion 311 and the lower surface 312b of the fourth sub-pressurizing portion 312.

The upper surface 311u of the third sub-pressurizing portion 311 may be positioned on one side in the third direction Z rather than on the upper surface 312u of the fourth sub-pressurizing portion 312. A side surface 311s of the third sub-pressurizing portion 311, which has a sixth thickness b3, may be disposed between the upper surface of the third sub-pressurizing portion 311 and the upper surface of the fourth sub-pressurizing portion 312. The side surface 311s of the third sub-pressurizing portion 311 may be a boundary between the third sub-pressurizing portion 311 and the fourth sub-pressurizing portion 312. For example, a step difference of the sixth thickness b3 may be formed in an area where the third sub-pressurizing portion 311 and the fourth sub-pressurizing portion 312 meet on the upper surfaces 311u and 312u of the second pressurizing portion 310. The sixth thickness b3 may be the same as a difference between the fourth thickness b1 and the fifth thickness b2. For example, the sixth thickness b3 may range from about 1 mm to about 5 mm.

The second pressurizing portion 310 may include a third sub-pressurizing portion 311 and a fourth sub-pressurizing portion 312, which have their respective thicknesses difference from each other, thereby forming a step difference between the heights of the upper surfaces 311u and 312u. Therefore, in a pressurizing process using the pressurizing member STG2, which pressurizes the second pressurizing portion 310 in contact with the upper surfaces 311u and 312u of the second pressurizing portion 310, a uniform pressurizing force may be transferred to the lower surface of the second pressurizing portion 310 for each area.

The third pressurizing base portion 320 may surround the second pressurizing portion 310. A plane shape of the third pressurizing base portion 320 may be a rectangular shape, but is not necessarily limited thereto. A lower surface of the third pressurizing base portion 320 may be positioned on one side in the third direction Z rather than on the lower surface of the second pressurizing portion 310. For example, the lower surface of the second pressurizing portion 310 may have a structure which protrudes toward the other side in the third direction Z (e.g., the −Z direction) rather than toward the lower surface of the third pressurizing base portion 320.

The fourth pressurizing base portion 330 may be disposed outside the third pressurizing base portion 320. The fourth pressurizing base portion 330 may surround the third pressurizing base portion 320.

The fourth pressurizing base portion 330 may include a fifth sub-pressurizing base portion 331 disposed on one end and the other end in the first direction X of the third mold 300, a sixth sub-pressurizing base portion 332 disposed on an inner side rather than on the fifth sub-pressurizing base portion 331, a seventh sub-pressurizing base portion 333 disposed on the other side in the second direction Y of the third pressurizing base portion 320, and an eighth sub-pressurizing base portion 334 disposed on the other side in the second direction Y of the seventh sub-pressurizing base portion 333.

The fifth sub-pressurizing base portion 331 may be positioned on one end and the other end in the first direction X of the third mold 300. The fifth sub-pressurizing base portion 331 may have a shape which extends longwise in the second direction Y. The fifth sub-pressurizing base portion 331 may have a shape in which one end in the second direction Y is protruded toward an inner side of the third mold 300.

The sixth sub-pressurizing base portion 332 may have a shape which extends longwise in the second direction Y. The sixth sub-pressurizing base 332 may have a shape in which one end in the second direction Y is recessed toward the inner side of the third mold 300.

A lower surface of the sixth sub-pressurizing base portion 332 may be positioned on the other side in the third direction Z rather than on the lower surface of the third pressurizing base portion 320. The lower surface of the sixth sub-pressurizing base portion 332 may be positioned on the other side in the third direction Z rather than on the lower surface of the fifth sub-pressurizing base portion 331.

The seventh sub-pressurizing base portion 333 may have a shape which extends longwise in the first direction X. The seventh sub-pressurizing base portion 333 may be positioned on the other side in the second direction Y of the third pressurizing base portion 320. The seventh sub-pressurizing base portion 333 may be disposed between the fifth sub-pressurizing base portion 331 disposed on one side in the first direction X and the fifth sub-pressurizing base portion 331 disposed on the other side in the first direction X. The seventh sub-pressurizing base portion 233 may be disposed between the sixth sub-pressurizing base portion 332 disposed on one side in the first direction X and the sixth sub-pressurizing base portion 332 disposed on the other side in the first direction X.

A lower surface of the seventh sub-pressurizing base portion 333 may be positioned on one side in the third direction Z rather than on the lower surface of the third pressurizing base portion 320. The lower surface of the seventh sub-pressurizing base portion 333 may be positioned on one side in the third direction Z rather than on the lower surface of the sixth sub-pressurizing base portion 332. The lower surface of the seventh sub-pressurizing base portion 333 may be positioned on one side in the third direction Z rather than a lower surface of the eighth sub-pressurizing base portion 334, which will be described later.

The eighth sub-pressurizing base portion 334 may be disposed on the other end in the second direction Y of the third mold 300, and may be surrounded by the seventh sub-pressurizing base portion 333 on a plane. The lower surface of the eighth sub-pressurizing base portion 334 may be positioned on the other side in the third direction Z rather than on the lower surface of the eighth sub-pressurizing base portion 333.

Hereinafter, a processing procedure for processing a cover window CW using an apparatus 1 for processing a cover window according to one embodiment of the present disclosure will be described with reference to FIGS. 12 to 14.

Figure 12:
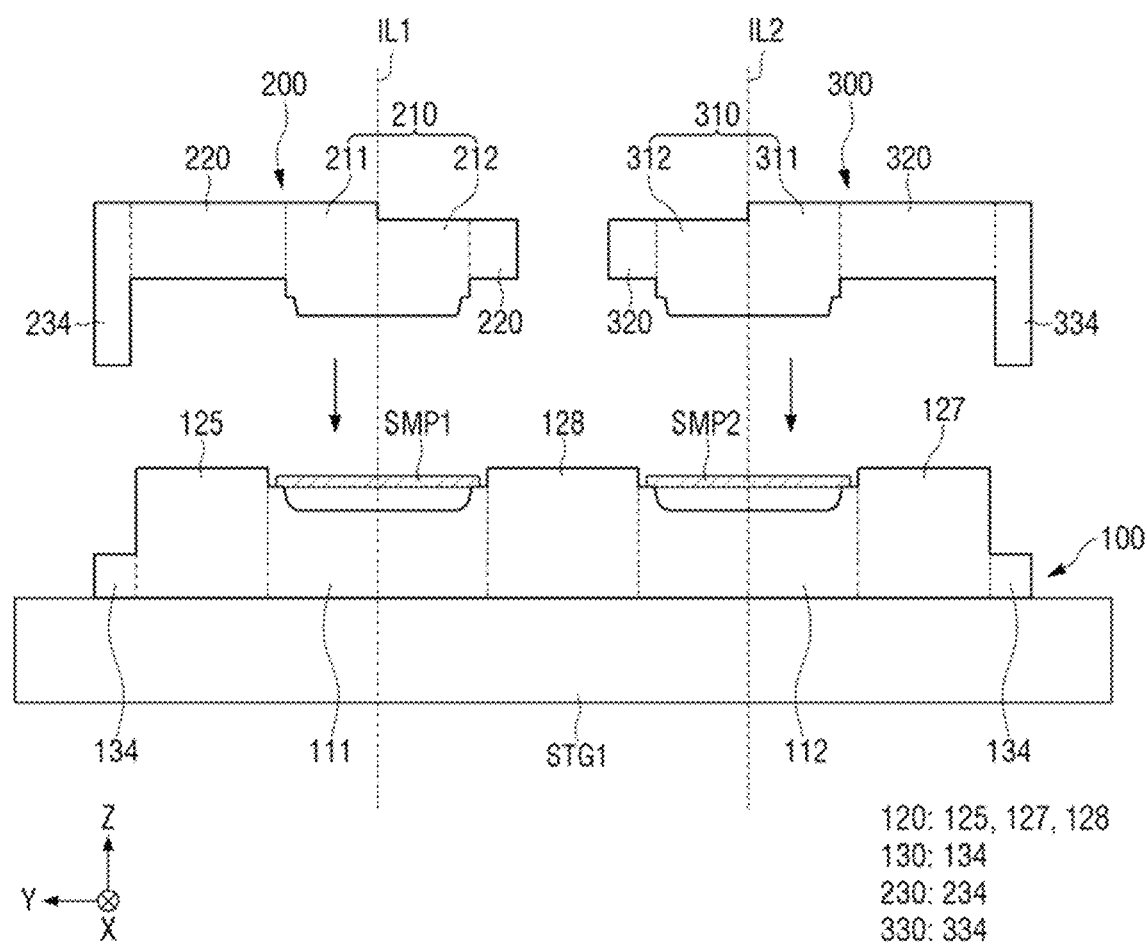
FIGS. 12 to 14 are schematic views that illustrate a process of processing a cover window using an apparatus for processing a cover window according to one embodiment of the present disclosure.
Figure 13:
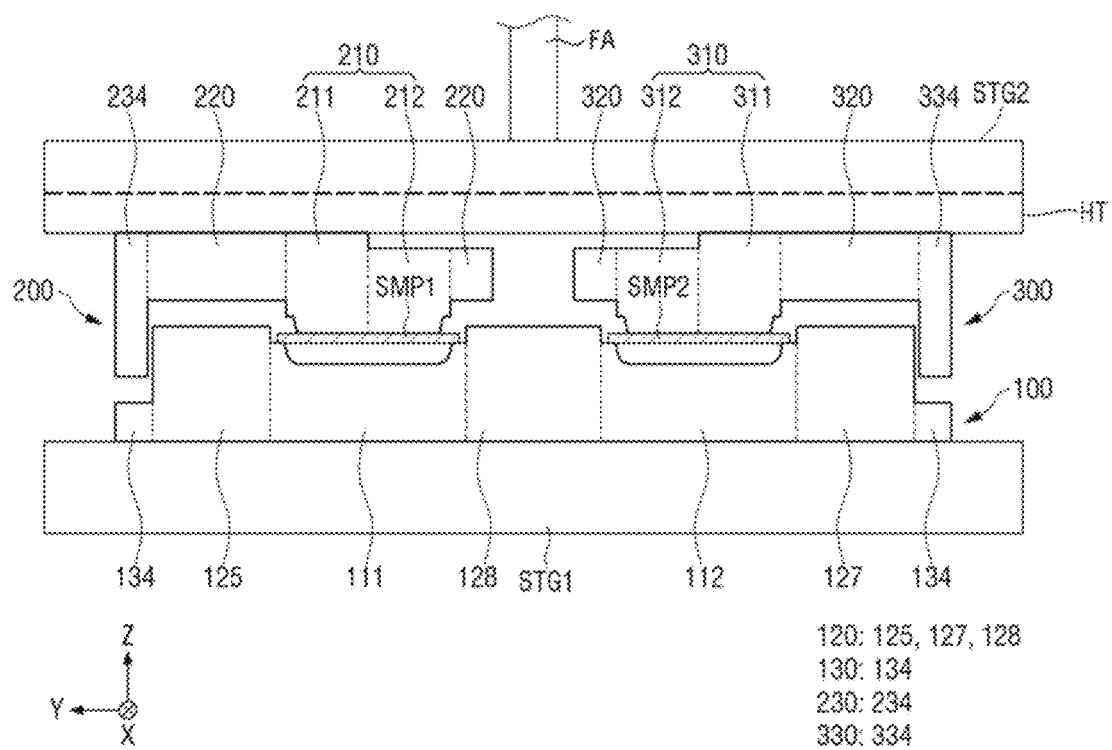
Figure 14:
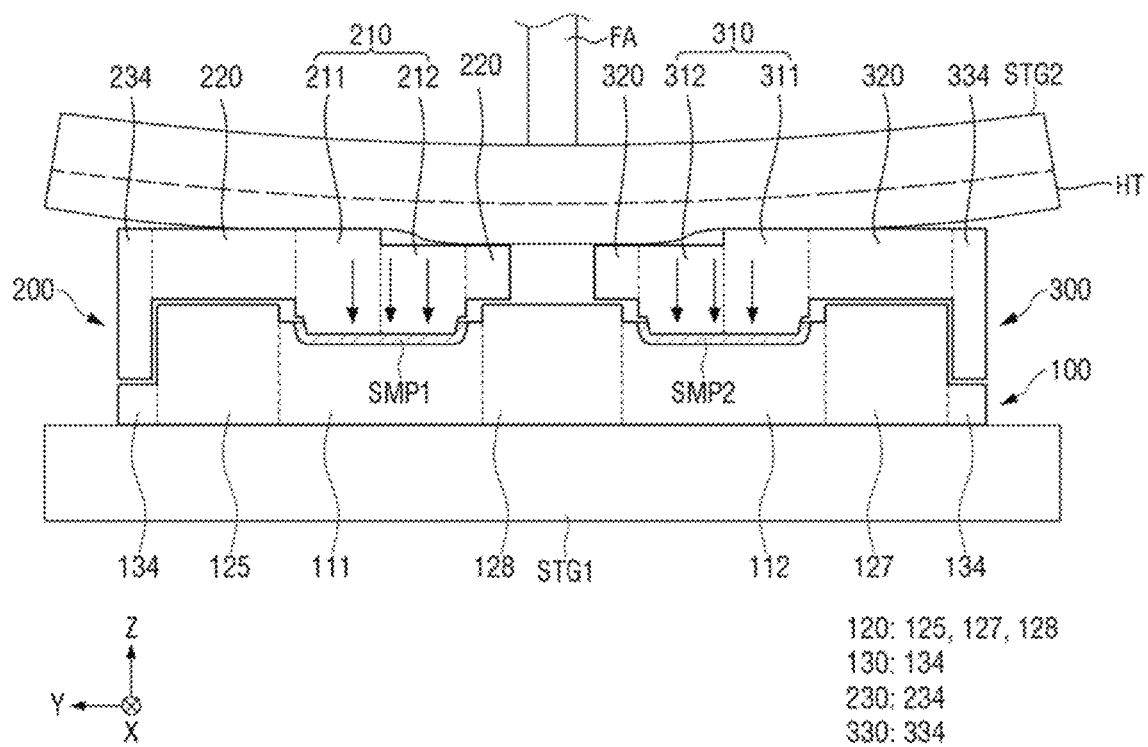

FIGS. 12 to 14 are schematic views that illustrate a process for processing a cover window, using an apparatus for processing a cover window according to one embodiment of the present disclosure.

Referring to FIGS. 12 to 14, the apparatus 1 for processing a cover window according to one embodiment may further include a stage STG1 and a pressurizing member STG2. The first mold 100 may be seated on the stage STG1.

The first mold is disposed on the stage STG1, a first processing target SMP1 is disposed on the first support 111 of the first mold 100, and a second processing target SMP2 is disposed on the second support 112. The first processing target SMP1 and the second processing target SMP2 may be processed into a cover window CW by using the apparatus 1 for processing a cover window according to one embodiment. In one example, the first processing target SMP1 and the second processing target SMP2 may be made of glass. The first processing target SMP1 and the second processing target SMP2 may be the substantially same elements.

A first virtual surface IL1 defining a boundary between the first sub-pressurizing portion 211 and the second sub-pressurizing portion 212 may divide the first support 111 into two portions. The first virtual surface IL1 may be a plane that extends from the side surface 211s of the first sub-pressurizing portion 211. For example, an area of the first support 111, which is overlapped with the first sub-pressurizing portion 211, may be symmetrical with an area of the first support 111, which is overlapped with the second sub-pressurizing portion 212, based on the first virtual surface IL1.

A second virtual surface IL2 defining a boundary between the third sub-pressurizing portion 311 and the fourth sub-pressurizing portion 312 may divide the second support 112 into two portions. The second virtual surface IL2 may be a plane that extends from the side surface 311s of the third sub-pressurizing portion 311. For example, an area of the second support 112, which is overlapped with the third sub-pressurizing portion 311, may be symmetrical with an area of the second support 112, which is overlapped with the fourth sub-pressurizing portion 312, based on the second virtual surface IL2.

The second mold 200 is brought into contact with the upper surface of the first processing target SMP1, and the third mold 300 is brought into contact with the upper surface of the second processing target SMP2. In detail, the lower surface of the first pressurizing portion 210 of the second mold 200 is brought into contact with the upper surface of the first processing target SMP1, and the lower surface of the second pressurizing portion 310 of the third mold 300 is brought into contact with the upper surface of the second processing target SMP2.

At this time, the pressurizing member STG2 may be disposed on the second mold 200 and the third mold 300. The pressurizing member STG2 may a rigid or semi-rigid structure such as a press that, when pressed against the second mold 200 and third mold 300, pressurizes the first pressurizing portion 210 of the second mold 200 and the second pressurizing portion 310 of the third mold 300. The pressurizing member STG2 may include a heater HT to provide heat to the second mold 200 and the third mold 300. The heater HIT may be disposed on a lower portion of the pressurizing member STG2, but is not necessarily limited thereto. The heater HT may be disposed inside the pressurizing member STG2.

In addition, a pressurizing axis FA may be connected to the pressurizing member STG2, and may pressurize the pressurizing member STG2 toward the other side in the third direction Z. For example, the pressurizing axis FA may pressurize the pressurizing member STG2 in the −Z direction. The pressurizing axis FA may be positioned at the center of the pressurizing member STG2. Therefore, a pressurizing force applied to the pressurizing member STG2 is the greatest at the center, and may be reduced toward the edge of the pressurizing member STG2.

Third, the second mold 200 and the third mold 300 may be pressurized by the pressurizing member STG2 using the pressurizing axis FA. At this time, due to a step difference in height formed on the upper surface of the first pressurizing portion 210 of the second mold 200 and the upper surface of the second pressurizing portion 310 of the third mold 300, the pressurizing force provided to the second mold 200 and the third mold 300 may be uniform for each area even though the pressurizing axis FA is positioned at the center of the pressurizing member STG2. For example, in the pressurizing process through the pressurizing axis FA and the pressurizing member STG, the pressurizing force applied to the first processing target SMP1 and the second processing target SMP2 may substantially be uniform for each area. Therefore, a processing defect rate of the cover window CW may be lowered through uniform pressurization.

In the apparatus 1 for processing a cover window according to one embodiment, a uniform pressure may be transferred to each area of each cover window CW processed by the above described method for processing the cover window CW that includes a curved edge. The uniform pressure is achieved at least in part through the second mold 200 that includes a first pressurizing portion 210 having a step difference formed on an upper surface and the third mold 300 that includes a second pressurizing portion 310 having a step difference formed on an upper surface. Therefore, defects due to non-uniform pressurization that may occur during the process of processing the cover window CW may be reduced.

Hereinafter, another embodiment of the apparatus 1 for processing a cover window will be described. The apparatus 1 for processing a cover window according to another embodiment will be described based on a difference from the apparatus 1 for processing a cover window according to one embodiment of the present disclosure.

Figure 15:
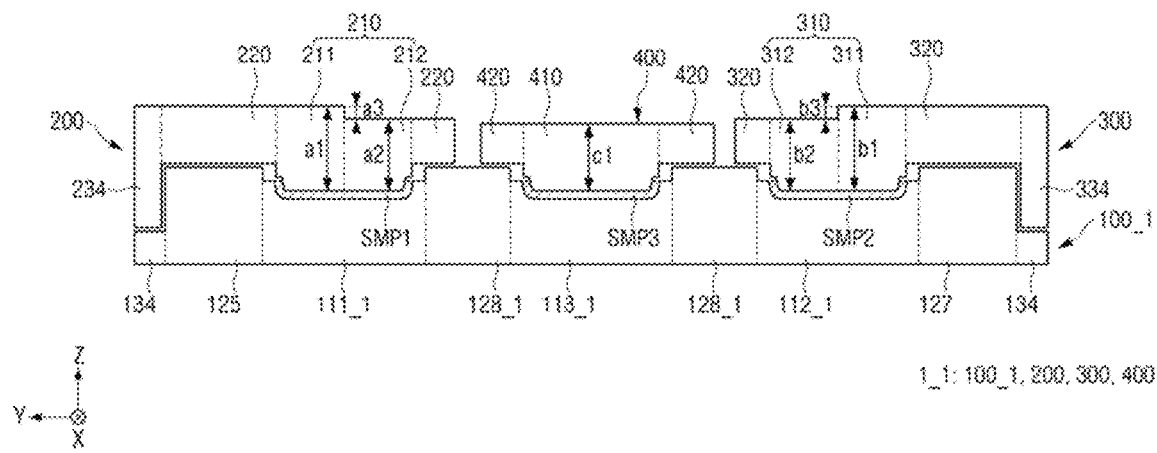
FIG. 15 is a schematic view that illustrates an apparatus for processing a cover window according to one embodiment of the present disclosure.

FIG. 15 is a schematic view that illustrates an apparatus for processing a cover window according to one embodiment of the present disclosure.

Referring to FIG. 15, an apparatus 1_1 for processing a cover window according to one embodiment of the present disclosure is different from the apparatus 1 in that a first mold 100_1 further includes a third support 113_1 disposed between a first support 111_1 and a second support 112_1 and the apparatus 1_1 further includes a fourth mold 400 disposed on the third support 113_1.

In the present embodiment, the first mold 100 may include first to third supports 111_1, 112_1 and 113_1. The first to third supports 111_1, 112_1 and 113_1 may be arranged along a second direction (e.g., a second direction Y). The first support 111_1 may be disposed on one side of the second direction of the first mold 100, the second support 112_1 may be disposed on the other side in the second direction of the first mold 100, and the third support 113_1 may be disposed between the first support 111_1 and the second support 112_1. The first to third supports 111_1, 112_1 and 113_1 may have the same structure. A fifth exhaust portion 128_1 may be disposed between the first support 111_1 and the third support 113_1 and between the second support 112_1 and the third support 113_1.

The apparatus 1_1 for processing a cover window according to the present embodiment may include a second mold 200 disposed on the first support 111_1 and a third mold 300 disposed on the second support 112_1. In the present embodiment, the second mold 200 and the third mold 300 may substantially be the same as the second mold 200 and the third mold 300 described above, which are included in the apparatus 1 for processing a cover window according to one embodiment. Therefore, in the present embodiment, the description of the second mold 200 and the third mold 300 will be omitted.

The fourth mold 400 may be disposed on the third support 113_1 of the first mold 100. The fourth mold 400 may include a fourth pressurizing portion 410. An upper surface of the fourth pressurizing portion 410 may be substantially flat. A lower surface of the fourth pressurizing portion 410 may have a flat central portion, and an edge portion thereof may include a curved surface. The lower surface of the fourth pressurizing portion 410 may have a structure substantially the same as that of each of the lower surface of the second pressurizing portion 210 of the second mold 200 and the lower surface of the third pressurizing portion 310 of the third mold 300.

The fourth pressurizing portion 410 may have a seventh thickness c1. The seventh thickness c1 of the fourth pressurizing portion 410 may be defined as a distance between flat upper and lower surfaces of the fourth pressurizing portion 410. The seventh thickness c1 may be thinner than the second thickness a2 and thinner than the fifth thickness b2, but is not necessarily limited thereto. The seventh thickness c1 may substantially be the same as the second thickness a2 and the fifth thickness b2.

In the apparatus 1_1 for processing a cover window according to the present embodiment, a uniform pressure may be transferred to each area of each of the cover windows CW processed by a process of processing the cover window CW that includes a curved edge. This uniform pressure may be applied through the second mold 200 that includes a first pressurizing portion 210 having a step difference formed on an upper surface and the third mold 300 that includes a second pressurizing portion 310 having a step difference formed on an upper surface. Therefore, defects due to non-uniform pressurization that may occur during the process of processing the cover window CW may be reduced.

In addition, a larger number of cover windows CW may be processed atone time by the apparatus 1_1 through the first mold 100 that includes the third support 113_1 disposed between the first support 111_1 and the second support 112_1 and the fourth mold 400 disposed on the third support 113_1.

Figure 16:
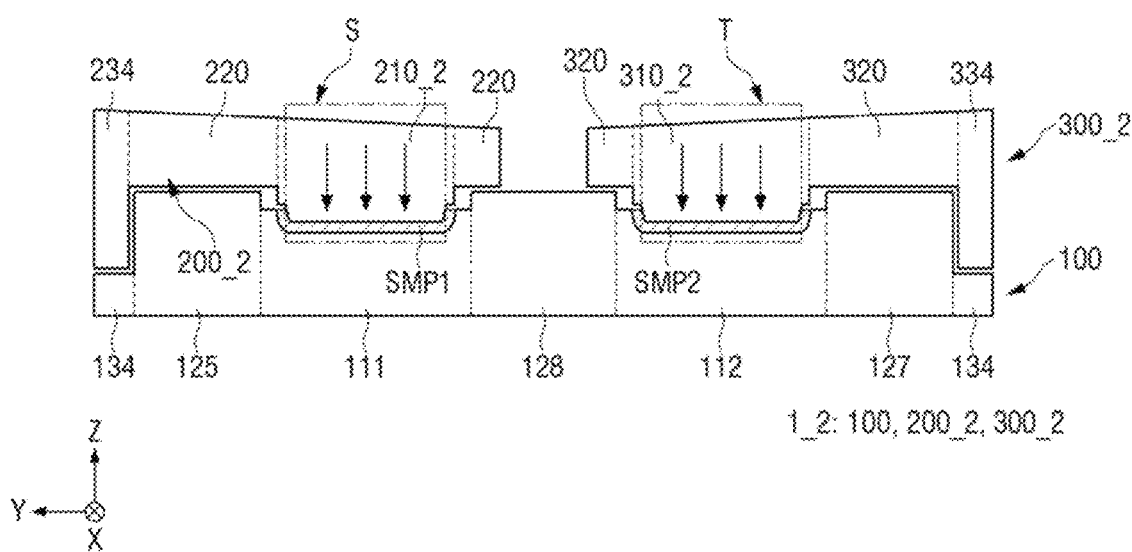
FIG. 16 is a schematic view that illustrates an apparatus for processing a cover window according to one embodiment of the present disclosure.
Figure 17:
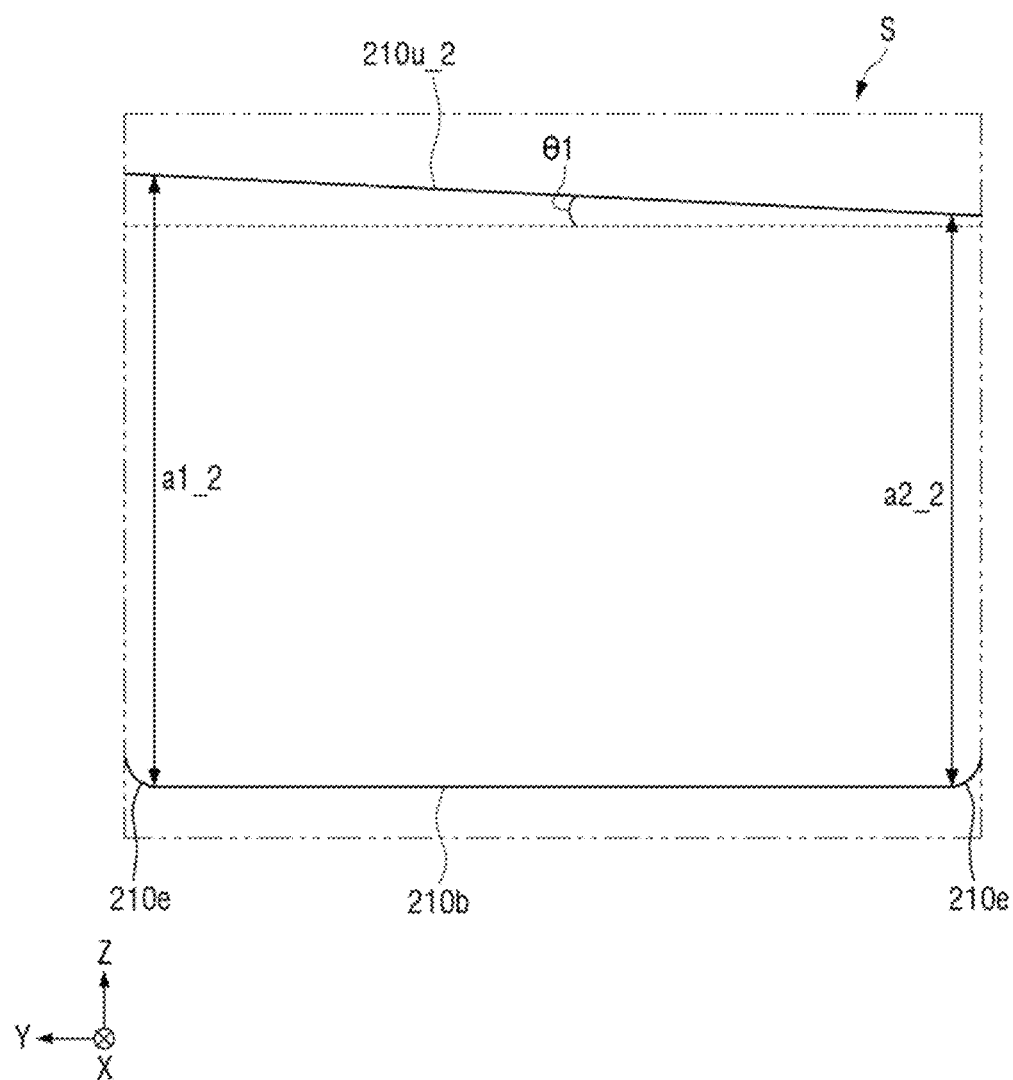
FIG. 17 is an enlarged view that illustrates an area S of FIG. 16.
Figure 18:
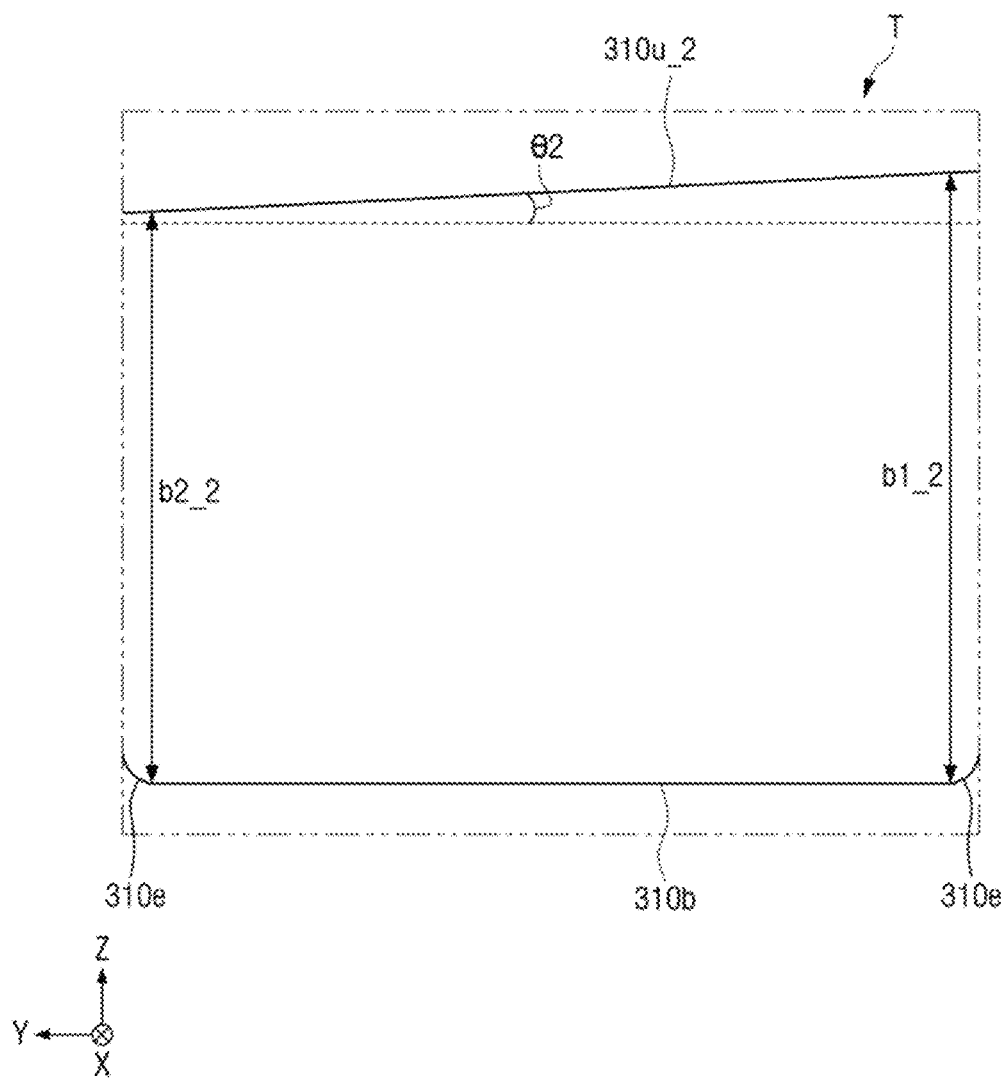
FIG. 18 is an enlarged view that illustrates an area T of FIG. 16.

FIG. 16 is a schematic view that illustrates an apparatus for processing a cover window according to one embodiment of the present disclosure. FIG. 17 is an enlarged view that illustrates an area S of FIG. 16. FIG. 18 is an enlarged view that illustrates an area T of FIG. 16.

An apparatus 1_2 for processing a cover window according to the present embodiment is different from the apparatus 1 in that the upper surfaces of a second mold 200_2 and a third mold 300_2 include inclined surfaces.

Referring to FIG. 17, in the present embodiment, a thickness of a first pressurizing portion 210_2 included in the second mold 200_2 may become smaller toward the other side in the second direction Y. For example, one end in the second direction Y of the first pressurizing portion 210_2 may have a first thickness a1_2, and the other end in the second direction Y thereof may have a second thickness a2_2 thinner than the first thickness a1_2. The thicknesses a1_2 and a2_2 of the first pressurizing portion 210_2 may gradually be reduced toward the second thickness a2_2 from the first thickness a1_2 as the first pressurizing portion 210_2 is oriented toward the other end in the second direction Y from one end in the second direction Y.

The first pressurizing portion 2102 included in the second mold 200_2 may include an inclined upper surface 210u_2. An inclined angle of the upper surface 210u_2 of the first pressurizing portion 210_2 may be a first angle θ1. The inclined angle of the upper surface 210u_2 of the first pressurizing portion 210_2 may be defined as an incline of the upper surface 210u_2 of the first pressurizing portion 210_2 with respect to a plane parallel with the lower surface 210b of the first pressurizing portion 210_2.

Referring to FIG. 18, in the present embodiment, thicknesses b1_2 and b2_2 of a second pressurizing portion 310_2 included in the third mold 3002 may become smaller toward one side in the second direction Y. For example, the other end in the second direction Y of the second pressurizing portion 3102 may have a fourth thickness b1_2, and one end in the second direction Y thereof may have a fifth thickness b2_2 thinner than the fourth thickness b1_2. The thicknesses of the second pressurizing portion 310_2 may gradually be reduced toward the fifth thickness b2_2 from the fourth thickness b1_2 as the second pressurizing portion 310_2 is oriented toward one end in the second direction Y from the other end in the second direction Y.

The second pressurizing portion 310_2 included in the third mold 300_2 may include an inclined upper surface 310u_2. An inclined angle of the upper surface 310u_2 of the second pressurizing portion 310_2 may be a second angle θ2. The inclined angle of the upper surface 310u_2 of the second pressurizing portion 310_2 may be defined as an incline of the upper surface of the second pressurizing portion 310_2 with respect to a plane parallel with the lower surface 310b of the second pressurizing portion 310_2.

In the apparatus 1_2 for processing a cover window according to the present embodiment, a uniform pressure may be transferred to each area of the cover window CW processed by a process of processing the cover window CW that includes a curved edge, through the second mold 200_2 that includes a first pressurizing portion 210_2 having an inclined upper surface 210u_2 and the third mold 300_2 that includes a second pressurizing portion 310_2 having an inclined upper surface 310u_2. Therefore, defects due to non-uniform pressurization that may occur during the process of processing the cover window CW may be reduced.

In addition, as the first pressurizing portion 210_2 and the second pressurizing portion 310_2 include the upper surfaces 210u_2 and 310u_2 that are inclined, the pressurizing force applied to the other side in the third direction Z may be more uniformly transferred to the pressurizing target during the pressurizing process. In this way, defects due to non-uniform pressurization that may occur during the process of processing the cover window CW may be more reduced.

Figure 19:
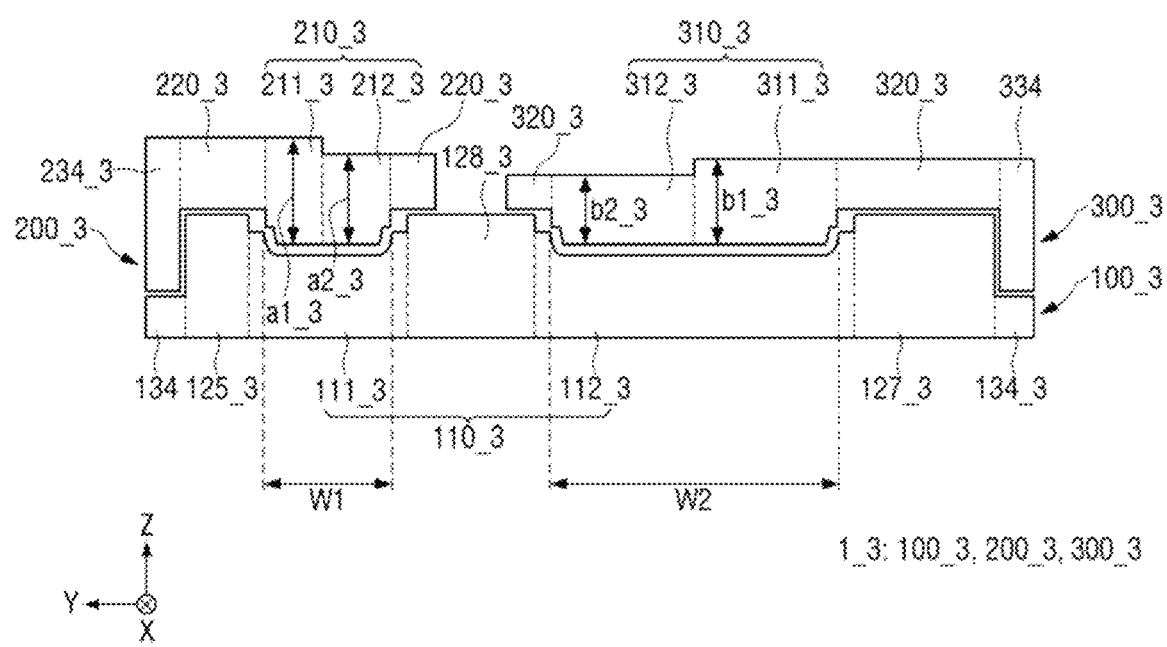
FIG. 19 is a schematic view that illustrates an apparatus for processing a cover window according to further one embodiment of the present disclosure.

FIG. 19 is a schematic view that illustrates an apparatus for processing a cover window according to further one embodiment of the present disclosure.

Referring to FIG. 19, an apparatus 13 for processing a cover window according to the present embodiment is different from the apparatus 1 in that a first mold includes a first support 111_3 and a second support 112_3, which have respective structures and sizes that are different from each other, and correspondingly, a second mold 200_3 and a third mold 300_3 which have respective structures and sizes different from each other.

The apparatus 13 for processing a cover window according to the present embodiment may include a first support 111_3 having a first width W1 and a second support 1123 having a second width W2 wider than the first width W1. FIG. 19 illustrates an embodiment in which the first support 111_3 and the second support 112_3 have respective sizes that are different from each other, but the present disclosure is not necessarily limited thereto. The first support 111_3 and the second support 112_3 may be different from each other in plane shapes of the upper surfaces.

The apparatus 13 for processing a cover window according to the present embodiment may include a second mold 200_3 that includes a first pressurizing portion 210_3 having a first width W1. The first pressurizing portion 210_3 may include a first sub-pressurizing portion 211_3 disposed on one side in the second direction Y and a second sub-pressurizing portion 212_3 disposed on the other side in the second direction Y of the first sub-pressurizing portion 211_3. The first sub-pressurizing portion 211_3 may have a first thickness a1_3, and the second sub-pressurizing portion 212_3 may have a second thickness a2_3 that is thinner than the first thickness a1_3. A step difference in height may be formed between an upper surface of the first sub-pressurizing portion 211_3 and an upper surface of the second sub-pressurizing portion 212_3.

The apparatus 1_3 for processing a cover window according to the present embodiment may include a third mold 300_3 that includes a second pressurizing portion 310_3 having a second width W2 that is wider than the first width W1. The second pressurizing portion 310_3 may include a third sub-pressurizing portion 311_3 disposed on the other side in the second direction Y and a fourth sub-pressurizing portion 312_3 disposed on one side in the second direction Y of the third sub-pressurizing portion 311_3. The third sub-pressurizing portion 311_3 may have a fourth thickness b1_3, and the fourth sub-pressurizing portion 312_3 may have a fifth thickness b2_3 that is thinner than the third thickness a1_3. The fourth thickness b1_3 may be thinner than the first thickness a1_3. The fifth thickness b2_3 may be thinner than the second thickness a2_3. A step difference may be formed between the upper surface of the third sub-pressurizing portion 311_3 and the upper surface of the fourth sub-pressurizing portion 312_3.

In the apparatus 1_3 for processing a cover window according to the present embodiment, a uniform pressure may be transferred to each area of each of the cover windows CW processed by a process of processing the cover window CW that includes a curved edge, through the second mold 200_3 that includes a first pressurizing portion 210_3 having an inclined upper surface and the third mold 300_3 that includes a second pressurizing portion 310_3 having an inclined upper surface. Therefore, defects due to non-uniform pressurization that may occur during the process of processing the cover window CW may be reduced.

In addition, the apparatus 1_3 for processing a cover window according to the present embodiment may process the cover window CW having different sizes through one-time processing procedure.

Embodiments of the present disclosure, such as the apparatuses 1, 1_2, and 1_3 described herein, may be prevent process defects in the manufacture and processing of cover windows by providing an even pressurization of processing targets through the stepped height structure of pressurization molds. Further, embodiments of the present disclosure provide an apparatus and a method for processing a cover window that allows for the simultaneous processing of multiple cover windows using a single pressurization axis with the stepped molds, thereby increasing a manufacture throughput.

Although embodiments of the inventive concepts have been disclosed for illustrative purposes, those skilled in the art will appreciate that various modifications, additions and substitutions are possible, without departing from the scope and spirit of the inventive concepts as disclosed in the accompanying claims.

What is claimed is:

1. An apparatus for processing one or more cover windows, the apparatus comprising:
a first mold including a first support and a second support spaced apart from the first support and facing a same direction as the first support, wherein the first support and second support are each configured to hold a processing target and include an upper surface that is recessed in the same direction as each other;
a second mold; and
a third mold spaced apart from the second mold,
wherein the second mold includes a first pressurizing portion overlapping with the first support and having a first thickness, and a second pressurizing portion connected with the first pressurizing portion and overlapping with the first support, wherein the second pressurizing portion has a second thickness thinner than the first thickness, and
wherein the third mold includes a third pressurizing portion overlapping with the second support and having a third thickness, and a fourth pressurizing portion connected with the third pressurizing portion and overlapping with the second support, wherein the fourth pressurizing portion has a fourth thickness thinner than the third thickness.

2. The apparatus of claim 1, wherein the second pressurizing portion is disposed between the first pressurizing portion and the fourth pressurizing portion, and the fourth pressurizing portion is disposed between the third pressurizing portion and the second pressurizing portion.

3. The apparatus of claim 1, wherein the first pressurizing portion includes a side surface disposed between an upper surface of the first pressurizing portion and an upper surface of the second pressurizing portion.

4. The apparatus of claim 3, wherein the first support is symmetric about a plane that is coplanar with and extends from the side surface of the first pressurizing portion.

5. The apparatus of claim 1, wherein the first thickness is equal to the third thickness, and the second thickness is equal to the fourth thickness.

6. The apparatus of claim 5, wherein the first support and the second support have the same shape.

7. The apparatus of claim 1, further comprising a fourth mold disposed between the second mold and the third mold, wherein the first mold further includes a third support disposed between the first support and the second support, and wherein the fourth mold is overlaps with the third support and has a fifth thickness thinner than the second thickness.

8. The apparatus of claim 1, further comprising:
a stage on which the first mold is seated; and
a press including a pressurizer, wherein the press is configured to push the first pressurizing portion and the second pressurizing portion toward the first support, and further configured to push the third pressurizing portion and the fourth pressurizing portion toward the second support by simultaneously pushing the second mold and the third mold with the pressurizer.

9. The apparatus of claim 8, wherein the press includes a heater configured to provide heat to the second mold and the third mold.

10. The apparatus of claim 1, wherein the second mold further includes a first protrusion disposed outside of the first pressurizing portion and the second pressurizing portion, the third mold further includes a second protrusion portion disposed outside of the third pressurizing portion and the fourth pressurizing portion, and
wherein the first mold further includes a first assembly portion overlapped with the first protrusion and a second assembly portion overlapped with the second protrusion.

11. An apparatus for processing one or more cover windows, the apparatus comprising:
a first mold including a first support and a second support spaced apart from the first support and facing a same direction as the first support, wherein the first support and the second support are each configured to hold a processing target and include an upper surface that is recessed in the same direction as each other;
a second mold; and
a third mold spaced apart from the second mold,
wherein the second mold overlaps with the first support and includes a lower surface conformal with an upper surface of the first support, and
wherein the third mold overlaps with the second support and includes a lower surface conformal with an upper surface of the second support.

12. The apparatus of claim 11, wherein the second mold includes a first pressurizing portion having a first thickness and a second pressurizing portion connected to the first pressurizing portion, wherein the second pressurizing portion has a second thickness thinner than the first thickness, and
wherein the third mold includes a third pressurizing portion having a third thickness and a fourth pressurizing portion connected with the third pressurizing portion, wherein the fourth pressurizing portion has a fourth thickness thinner than the third thickness, and
wherein the first pressurizing portion includes a first side surface disposed between an upper surface of the first pressurizing portion and an upper surface of the second pressurizing portion, the third pressurizing portion includes a second side surface disposed between an upper surface of the third pressurizing portion and an upper surface of the fourth pressurizing portion, and the first side surface and the second side surface are disposed opposite to each other.

13. The apparatus of claim 12, wherein the first support is symmetric about a plane that is coplanar with and extended from the first side surface.

14. The apparatus of claim 11, further comprising a fourth mold disposed between the second mold and the third mold, wherein the first mold further includes a third support disposed between the first support and the second support, and wherein the fourth mold includes a lower surface conformal with an upper surface of the third support.

15. The apparatus of claim 14, wherein a thickness of the fourth mold in an area where the fourth mold overlaps with the third support is thinner than a thickness of the second mold in an area where the second mold overlaps with the first support, and thinner than a thickness of the third mold in an area where the third mold overlaps with the second support.

16. The apparatus of claim 11, wherein a thickness of the second mold in an area where the second mold overlaps with the first support reduces along a direction extending toward the third mold, and wherein a thickness of the third mold in an area where the third mold overlaps with the second support reduces along a direction extending toward the second mold.

17. The apparatus of claim 11, wherein an area of the first support configured to hold a processing target is smaller than an area of the second support configured to hold a processing target.

18. The apparatus of claim 11, further comprising:
   a stage on which the first mold is seated; and
   a press configured to simultaneously push the second mold toward the first support and the third mold toward the second support.

19. The apparatus of claim 18, wherein the press includes a heater configured to provide heat to the second mold and the third mold.

\* \* \* \* \*